US012394387B2

(12) United States Patent
Xie

(10) Patent No.: US 12,394,387 B2

(45) Date of Patent: Aug. 19, 2025

(54) DISPLAY PANEL, METHOD FOR DRIVING A DISPLAY PANEL, AND DISPLAY DEVICE

(71) Applicant: Hubei Yangtze Industrial Innovation Center Of Advanced Display Co., Ltd., Wuhan (CN)

(72) Inventor: Feng Xie, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 18/743,949

(22) Filed: Jun. 14, 2024

(65) Prior Publication Data

US 2024/0386856 A1 Nov. 21, 2024

(30) Foreign Application Priority Data

Mar. 29, 2024 (CN) ......................... 202410383558.6

(51) Int. Cl.
*G09G 3/34* (2006.01)

(52) U.S. Cl.
CPC ..... *G09G 3/344* (2013.01); *G09G 2300/0852* (2013.01); *G09G 2320/0223* (2013.01); *G09G 2330/021* (2013.01)

(58) Field of Classification Search
CPC ...... G09G 3/34; G09G 3/3258; G09G 3/3266; G09G 3/3291; G09G 3/20
See application file for complete search history.

(56) References Cited

U.S. PATENT DOCUMENTS

| | | | | |
|---|---|---|---|---|
| 2007/0159150 | A1* | 7/2007 | Hosokawa | H03K 17/687 323/285 |
| 2017/0200414 | A1* | 7/2017 | Li | G09G 3/3266 |
| 2019/0096307 | A1* | 3/2019 | Liang | G11C 19/287 |
| 2021/0193013 | A1* | 6/2021 | Xu | H10K 59/353 |
| 2021/0358404 | A1* | 11/2021 | Hu | G09G 3/3266 |
| 2022/0052126 | A1* | 2/2022 | Zhao | H10D 86/421 |
| 2024/0155902 | A1* | 5/2024 | Li | H10K 59/1315 |
| 2024/0177660 | A1* | 5/2024 | Huangfu | G09G 3/3233 |

FOREIGN PATENT DOCUMENTS

| | | | |
|---|---|---|---|
| CN | 109509430 | A | 3/2019 |
| CN | 116682384 | A | 9/2023 |

* cited by examiner

*Primary Examiner* — Michael A Faragalla
(74) *Attorney, Agent, or Firm* — KDW FIRM PLLC

(57) ABSTRACT

Provided are a display panel, a driving method thereof and a display device. A pixel circuit in the display panel includes a drive transistor and a boosting unit. A first electrode of the drive transistor is connected to a pixel electrode. A first terminal of the boosting unit is connected to a first data signal line. The first data signal line receives a first data signal. A second terminal of the boosting unit is connected to a gate of the drive transistor, or a second terminal of the boosting unit is connected to a second electrode of the drive transistor. In the display panel, the driving method thereof and the display device, the first data signal is boosted by the boosting unit, the boosted first data signal is output to the gate or the second electrode of the drive transistor.

18 Claims, 15 Drawing Sheets

DISPLAY PANEL, METHOD FOR DRIVING A DISPLAY PANEL, AND DISPLAY DEVICE

CROSS-REFERENCE TO RELATED APPLICATION(S)

This application claims priority to Chinese Patent Application No. 202410383558.6 filed with the China National Intellectual Property Administration (CNIPA) on Mar. 29, 2024, the disclosure of which is incorporated herein by reference in its entirety.

TECHNICAL FIELD

The present disclosure relates to the field of display technology and, in particular, a display panel, a method for driving a display panel, and a display device.

BACKGROUND

With the development of digital technology, more and more display devices such as electronic papers (EPs) have entered people's lives. Electronic papers can keep displaying for a long time when the power is off and have the advantages such as lightness, thinness, low power consumption and a simple technique. Therefore, the electronic papers are increasingly favored by people.

A display principle of a color electronic paper is that color electrophoretic particles in an electrophoretic display layer are driven by an electric field so that the color electrophoretic particles are arranged in a particular manner to display a required color image.

The color electronic paper needs a data signal with a relatively high voltage for implementing color display, resulting in a relatively large voltage drop (current resistance (IR) drop) generated on a data signal line for transmitting the data signal and also an increase in the power consumption of the color electronic paper.

SUMMARY

The present disclosure provides a display panel, a method for driving a display panel, and a display device.

According to an aspect of the present disclosure, a display panel is provided. The display panel includes a pixel circuit, and the pixel circuit includes a drive transistor and a boosting unit. A first electrode of the drive transistor is connected to a pixel electrode. A first terminal of the boosting unit is connected to a first data signal line, and the first data signal line is configured to receive a first data signal. A second terminal of the boosting unit is connected to a gate of the drive transistor, or a second terminal of the boosting unit is connected to a second electrode of the drive transistor.

According to another aspect of the present disclosure, a method for driving a display panel is provided and used for driving the display panel described above. A working period of the pixel circuit includes a data write stage.

The driving method includes the steps described below.

In the data write stage, the first data signal line provides the first data signal to the first terminal of the boosting unit.

The boosting unit increases a voltage of the first data signal.

According to another aspect of the present disclosure, a display device is provided. The display device includes a display panel, the display panel includes a pixel circuit, and the pixel circuit includes a drive transistor and a boosting unit. A first electrode of the drive transistor is connected to a pixel electrode. A first terminal of the boosting unit is connected to a first data signal line, and the first data signal line is configured to receive a first data signal. A second terminal of the boosting unit is connected to a gate of the drive transistor, or a second terminal of the boosting unit is connected to a second electrode of the drive transistor.

In the display panel, the driving method thereof and the display device provided in embodiments of the present disclosure, the boosting unit is disposed in the pixel circuit. The boosting unit is used for raising the voltage input from the first terminal of the boosting unit and outputting the raised voltage from the second terminal of the boosting unit. The first terminal of the boosting unit is electrically connected to the first data signal line and configured to receive the first data signal transmitted from the first data signal line, and the first data signal boosted by the boosting unit is output from the second terminal of the boosting unit. The second terminal of the boosting unit is electrically connected to the gate or the second electrode of the drive transistor to output the boosted first data signal to the gate or the second electrode of the drive transistor.

It is to be understood that the content described in this section is neither intended to identify key or critical features of the embodiments of the present disclosure nor intended to limit the scope of the present disclosure. Other features of the present disclosure become easily understood through the description provided hereinafter.

BRIEF DESCRIPTION OF DRAWINGS

To illustrate solutions of embodiments of the present disclosure more clearly, the drawings used in the description of the embodiments are briefly described hereinafter. Apparently, the drawings described hereinafter illustrate part of the embodiments of the present disclosure, and those of ordinary skill in the art may obtain other drawings based on the drawings described hereinafter on the premise that no creative work is done.

DETAILED DESCRIPTION

To make solutions of the present disclosure better understood by those skilled in the art, solutions of embodiments of the present disclosure are described hereinafter clearly and completely in conjunction with drawings in embodiments of the present disclosure. Apparently, the embodiments described hereinafter are part, not all, of embodiments of the present disclosure. Based on embodiments of the present disclosure, all other embodiments obtained by those of ordinary skill in the art are within the scope of the present disclosure on the premise that no creative work is done.

It is to be noted that terms “first”, “second”, and the like in the description, claims, and drawings of the present disclosure are used for distinguishing between similar objects and are not necessarily used for describing a particular order or sequence. It is to be understood that data used in this manner are interchangeable in appropriate cases so that the embodiments of the present disclosure described herein can be implemented in an order not illustrated or described herein. In addition, terms “comprising”, “including”, and any variation thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

Figure 1:
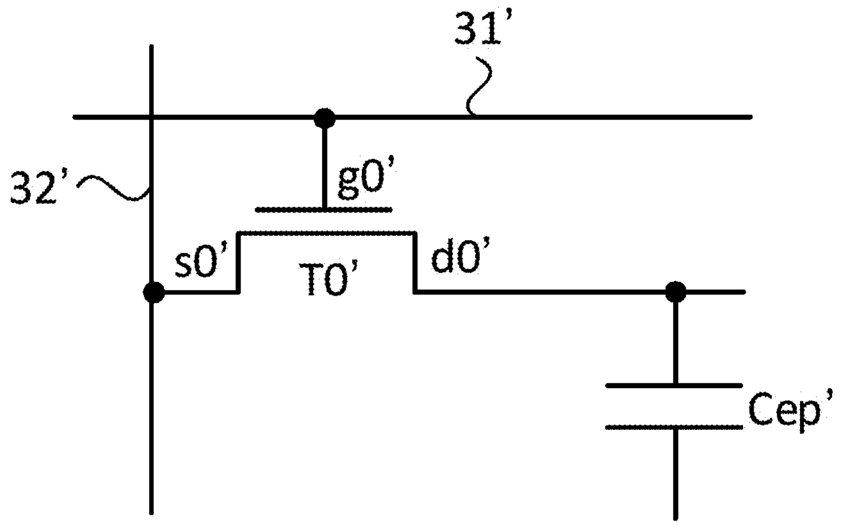
FIG. 1 is a structure diagram of a pixel circuit in the related art.

FIG. 1 is a structure diagram of a pixel circuit in the related art. As shown in FIG. 1, the pixel circuit includes a drive transistor T0', a first electrode d0' of the drive transistor T0' is connected to a pixel electrode (not shown in the drawings), a gate g0' of the drive transistor T0' is connected to a scan signal line 31', and a second electrode s0' of the drive transistor T0' is connected to a data signal line 32'. A pixel capacitor Cep' in FIG. 1 refers to a capacitor between the pixel electrode and a common electrode layer. An electrophoretic display layer is located between the pixel electrode and the common electrode layer and includes electrophoretic particles of a plurality of colors. The scan signal line 31' may provide a scan signal to the gate g0' of the drive transistor T0' so that the drive transistor T0' is turned on. In this case, a data signal provided by the data signal line 32' is transmitted to the pixel electrode through the drive transistor T0' so that an electric field is formed between the pixel electrode and the common electrode layer. The electric field generates an attraction force or a repulsive force to the electrophoretic particles so that the electrophoretic particles move under an action of the electric field.

Further, electrophoretic particles of different colors carry different charges. When a particular data signal voltage is applied to the pixel electrode, electrophoretic particles carrying corresponding charges may move in a direction facing or facing away from the pixel electrode. Therefore, positions of electrophoretic particles of different colors in the electrophoretic display layer can be accurately controlled by providing different data signal voltages. In this manner, electrophoretic particles of a plurality of colors simultaneously or partially appear on the surface of the electrophoretic display layer to form color mixing and display a colored display effect.

To prevent color contamination and ensure sharpness and saturation of color display, the data signal voltage needs a relatively large voltage span to cover all necessary voltage ranges, thereby ensuring that positions of electrophoretic particles of each color can be accurately controlled. Therefore, the data signal line 32' can provide a data signal voltage with a relatively large voltage span range to the pixel electrode. For example, the data signal line 32' generally needs to provide a data signal voltage within a range of ±28 V, that is, the data signal line 32' needs to transmit the data signal voltage within the entire voltage interval from −28 V to +28 V.

Further, whether the drive transistor T0' is turned on depends on whether a voltage difference between the gate g0' of the drive transistor T0 and the second electrode s0' of the drive transistor T0' exceeds a threshold voltage Vth0' of the drive transistor T0'. Therefore, to enable the drive transistor T0' to turn on, a voltage of the scan signal received by the gate g0' of the drive transistor T0' is set to be higher than a sum of the voltage of the data signal input from the second electrode s0' of the drive transistor T0' and the threshold voltage Vth0'. For example, assuming that the threshold voltage Vth0' of the drive transistor T0' is about 1 V, when a value range of the data signal voltage is ±28 V, the voltage of the scan signal received by the gate g0' of the drive transistor T0' needs to be within a range of about ±30 V.

When the voltage of the gate g0' of the drive transistor T0' is high enough, the drive transistor T0' can work in a saturated region. In the state, the drive transistor T0' has a smaller on-resistance and a larger on-current. Therefore, a larger voltage of the gate g0' can enable the drive transistor T0' to quickly enter the saturated region to provide a larger on-current, thereby quickly and fully writing the data signal into the pixel electrode, shortening the charging time of a pixel and contributing to improving an image refresh rate of the display panel.

Therefore, when the value range of the data signal voltage is ±28 V, the scan signal line 31' generally needs to provide the voltage of the scan signal of ±38 V to the gate g0' of the drive transistor T0', that is, the scan signal line 31' needs to be able to transmit the voltage of the scan signal within the entire voltage interval from −38 V to +38 V. In this manner, the drive transistor T0' can work in the saturated region to provide a larger on-current, thereby quickly and efficiently writing the data signal.

However, high voltages on the data signal line 32' and the scan signal line 31' may cause a larger IR drop of wires and larger power consumption of the product.

Embodiments of the present disclosure provide a display panel. The display panel includes a pixel circuit. The pixel circuit includes a drive transistor and a boosting unit. A first electrode of the drive transistor is connected to a pixel electrode. A first terminal of the boosting unit is connected to a first data signal line. The first data signal line is configured to receive a first data signal. A second terminal of the boosting unit is connected to a gate of the drive transistor, or the second terminal of the boosting unit is connected to a second electrode of the drive transistor.

Using the above technical solution, the boosting unit is disposed in the pixel circuit. The boosting unit is used for raising a voltage input from the first terminal of the boosting unit and outputting the raised voltage from the second terminal of the boosting unit. The first terminal of the boosting unit is electrically connected to the first data signal line for receiving the first data signal transmitted from the first data signal line, and the first data signal boosted by the boosting unit is output from the second terminal of the boosting unit. The second terminal of the boosting unit is electrically connected to the gate or the second electrode of the drive transistor to output the boosted first data signal to the gate or the second electrode of the drive transistor so that a higher voltage can be loaded at the gate or the second electrode of the drive transistor through the first data signal with a lower voltage transmitted by the first data signal line. In this manner, while a requirement for a larger voltage interval at the gate or the second electrode of the drive transistor is met, a voltage value of the first data signal transmitted on the first data signal line is reduced, thereby effectively reducing an IR drop of the first data signal line and reducing the overall power consumption.

The preceding is the core idea of the present disclosure. Technical solutions of embodiments of the present disclosure are described clearly and completely hereinafter in conjunction with drawings in the embodiments of the present disclosure. Based on the embodiments of the present disclosure, all other embodiments obtained by those of ordinary skill in the art without any creative effort are within the scope of the present disclosure.

Figure 2:
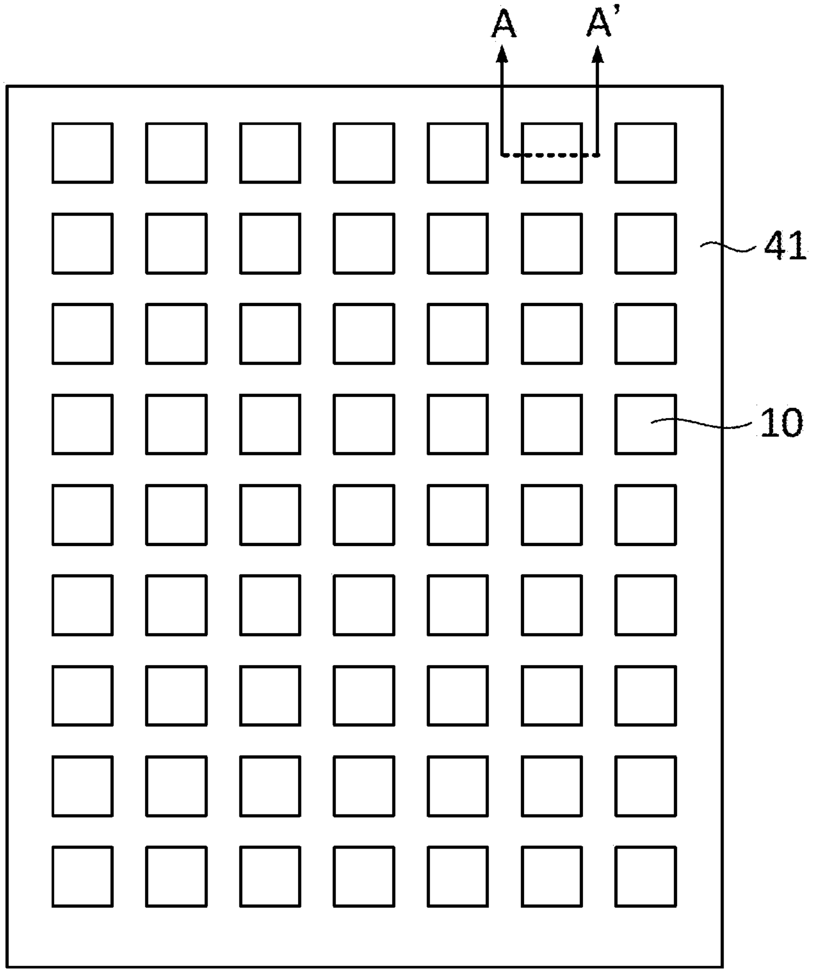
FIG. 2 is a structure diagram of a display panel according to an embodiment of the present disclosure.
Figure 3:
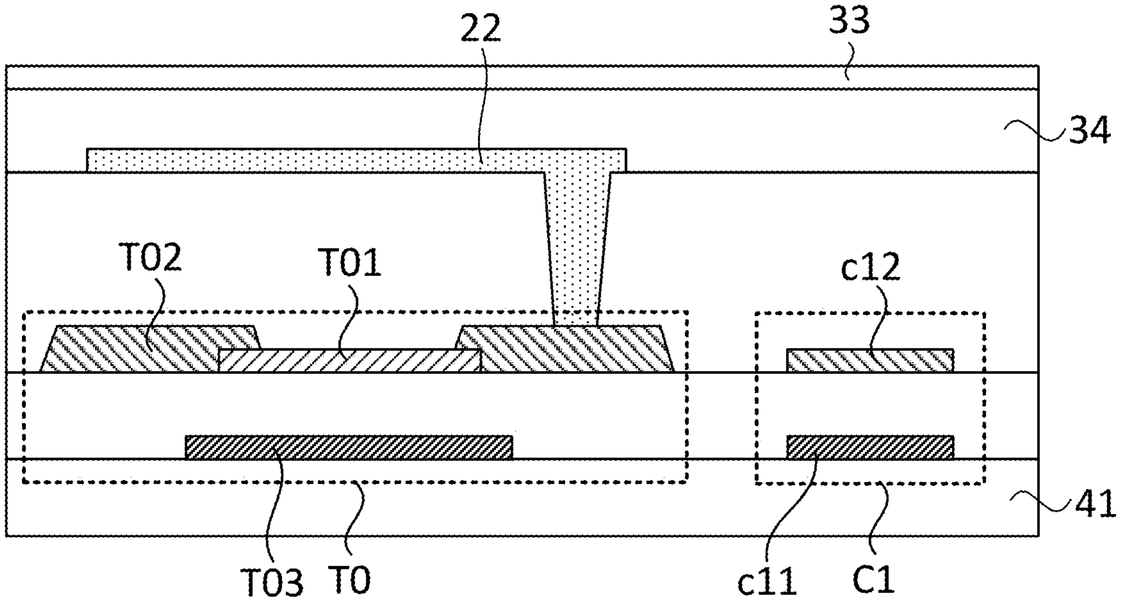
FIG. 3 is a sectional view taken along A-A' of FIG. 2.
Figure 4:
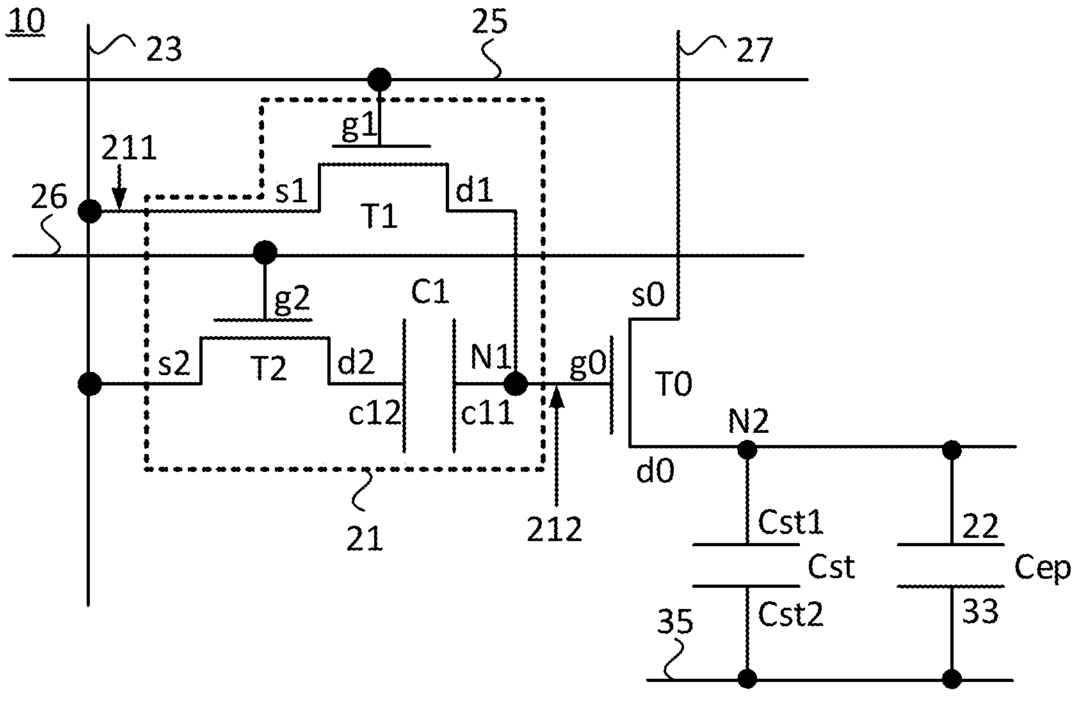
FIG. 4 is a structure diagram of a pixel circuit according to an embodiment of the present disclosure.
Figure 5:
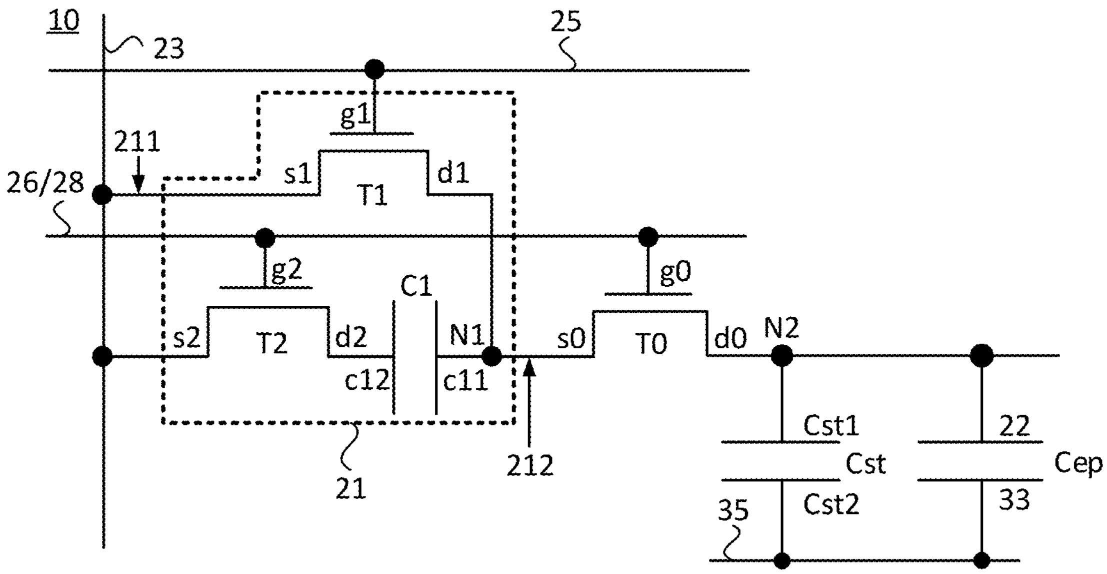
FIG. 5 is a structure diagram of another pixel circuit according to an embodiment of the present disclosure.

FIG. 2 is a structure diagram of a display panel according to an embodiment of the present disclosure. FIG. 3 is a sectional view taken along A-A' of FIG. 2. FIG. 4 is a structure diagram of a pixel circuit according to an embodiment of the present disclosure. FIG. 5 is a structure diagram of another pixel circuit according to an embodiment of the present disclosure. As shown in FIGS. 2 to 5, the display panel provided in the embodiment of the present disclosure includes a pixel circuit 10, the pixel circuit 10 includes a drive transistor T0 and a boosting unit 21, and a first electrode d0 of the drive transistor T0 is connected to a pixel electrode 22. A first terminal 211 of the boosting unit 21 is connected to a first data signal line 23, and the first data signal line 23 is configured to receive a first data signal. A second terminal 212 of the boosting unit 21 is connected to a gate g0 of the drive transistor T0, or the second terminal 212 of the boosting unit 21 is connected to a second electrode s0 of the drive transistor T0.

As shown in FIGS. 2 to 5, the display panel provided in the embodiment of the present disclosure may include a first substrate 41, and a plurality of pixel circuits 10 and a plurality of pixel electrodes 22 are disposed on the first substrate 41. The plurality of pixel electrodes 22 may be disposed on one side of the plurality of pixel circuits 10 facing away from the first substrate 41. The plurality of pixel circuits 10 are electrically connected to the plurality of pixel electrodes 22 in one-to-one correspondence.

Both the plurality of pixel circuits 10 and the plurality of pixel electrodes 22 may be arranged in an array. Arrangement manners of the plurality of pixel circuits 10 and the plurality of pixel electrodes 22 are not limited to the arrangement manner shown in FIG. 2, which is not limited in the embodiments of the present disclosure.

With continued reference to FIGS. 2 to 5, the drive transistor T0 is disposed in the pixel circuit 10, and the first electrode d0 of the drive transistor T0 is electrically connected to the pixel electrode 22. A voltage of the gate g0 of the drive transistor T0 can control the drive transistor T0 to turn on or turn off. When the drive transistor T0 is turned on, a signal received by the second electrode s0 of the drive transistor T0 can be transmitted to the first electrode d0 of the drive transistor T0 and then transmitted to the pixel electrode 22.

It is to be noted that a pixel capacitor Cep in FIGS. 3 to 5 refers to a capacitor between the pixel electrode 22 and a common electrode layer 33. An electrophoretic display layer 34 may be disposed between the pixel electrode 22 and the common electrode layer 33 and includes electrophoretic particles of a plurality of colors. When the drive transistor T0 is turned on, in this case, the signal received by the second electrode s0 of the drive transistor T0 is transmitted to the pixel electrode 22 by the drive transistor T0 so that an electric field can be formed between the pixel electrode 22 and the common electrode layer 33. The electric field generates an attraction force or a repulsive force to the electrophoretic particles so that the electrophoretic particles move under an action of the electric field.

Further, electrophoretic particles of different colors carry different charges. When a particular voltage signal is applied to the pixel electrode 22, electrophoretic particles carrying corresponding charges may move in a direction facing or facing away from the pixel electrode 22. Therefore, positions of electrophoretic particles of different colors in the electrophoretic display layer 34 can be accurately controlled by writing different signal voltages into the pixel electrode 22 by the drive transistor T0. In this manner, electrophoretic particles of a plurality of colors simultaneously or partially appear on the surface of the electrophoretic display layer 34, thereby forming the color mixing and displaying the colored display effect.

As described above, to prevent color contamination, ensure sharpness and saturation of color display and ensure an image fresh rate of the display panel, a voltage at the second electrode s0 of the drive transistor T0 needs to be within a voltage interval of ±28 V, and the voltage at the gate g0 of the drive transistor T0 needs to be within a voltage interval of ±38 V. As a result, a larger IR drop may be generated on a signal line that provides a corresponding signal to the second electrode s0 or the gate g0 of the drive transistor T0 and power consumption may be increased.

As shown in FIGS. 4 and 5, the boosting unit 21 is disposed in the pixel circuit 10 and includes the first terminal 211 and the second terminal 212. The boosting unit 21 is used for raising a voltage input from the first terminal 211 through an internal boosting mechanism and outputting the raised voltage from the second terminal 212, that is, the voltage output from the second terminal 212 of the boosting unit 21 is greater than the voltage input from the first terminal 211 of the boosting unit 21.

The first terminal 211 of the boosting unit 21 is electrically connected to the first data signal line 23 for receiving the first data signal transmitted from the first data signal line 23. The boosting unit 21 increases a voltage value of the first data signal through the internal boosting mechanism. Subsequently, the boosted first data signal is output from the second terminal 212 of the boosting unit 21. It is to be understood that the voltage output from the second terminal 212 of the boosting unit 21 is greater than the voltage of the first data signal loaded on the first data signal line 23.

With continued reference to FIG. 4, the second terminal 212 of the boosting unit 21 may be electrically connected to the gate g0 of the drive transistor T0 so that the boosted first data signal is output to the gate g0 of the drive transistor T0. In this manner, the first data signal with a lower voltage can be transmitted by the first data signal line 23 and a higher voltage can be loaded at the gate g0 of the drive transistor T0 so that the requirement for a larger voltage interval at the gate g0 of the drive transistor T0 is met, and at the same time, the voltage value of the first data signal transmitted on the first data signal line 23 is reduced. For example, that the boosting unit 21 raises the voltage input from the first terminal 211 of the boosting unit 21 by three times is used as an example for description. If the voltage at the gate g0 of the drive transistor T0 needs to be within the voltage interval of ±38 V, the voltage value of the first data signal transmitted on the first data signal line 23 needs to be within a voltage interval of only ±19 V to meet a requirement for the voltage at the gate g0 of the drive transistor T0 and no longer needs to be within the voltage interval of ±28 V so that the first data signal with a lower voltage can be transmitted on the first data signal line 23, thereby effectively reducing the IR drop of the first data signal line 23 and reducing the overall power consumption.

In another embodiment, as shown in FIG. 5, the second terminal 212 of the boosting unit 21 is electrically connected to the second electrode s0 of the drive transistor T0 so that the boosted first data signal is output to the second electrode s0 of the drive transistor T0. In this manner, the first data signal with a lower voltage is transmitted by the first data signal line 23 to implement the loading of a higher voltage at the second electrode s0 of the drive transistor T0 so that the requirement for a larger voltage interval at the second electrode s0 of the drive transistor T0 is met, and the voltage value of the first data signal transmitted on the first data signal line 23 is reduced at the same time. For example, that the boosting unit 21 raises the voltage input from the first terminal 211 of the boosting unit 21 by three times is used as an example for description. If the voltage at the second electrode s0 of the drive transistor T0 needs to be within the voltage interval of ±28 V, the voltage value of the first data signal transmitted on the first data signal line 23 needs to be within a voltage interval of only ±14 V to meet the requirement for the voltage at the second electrode s0 of the drive transistor T0 and no longer needs to be within the voltage interval of ±28 V so that the first data signal with a lower voltage can be transmitted on the first data signal line 23, thereby effectively reducing the IR drop of the first data signal line 23 and reducing the overall power consumption.

Figure 6:
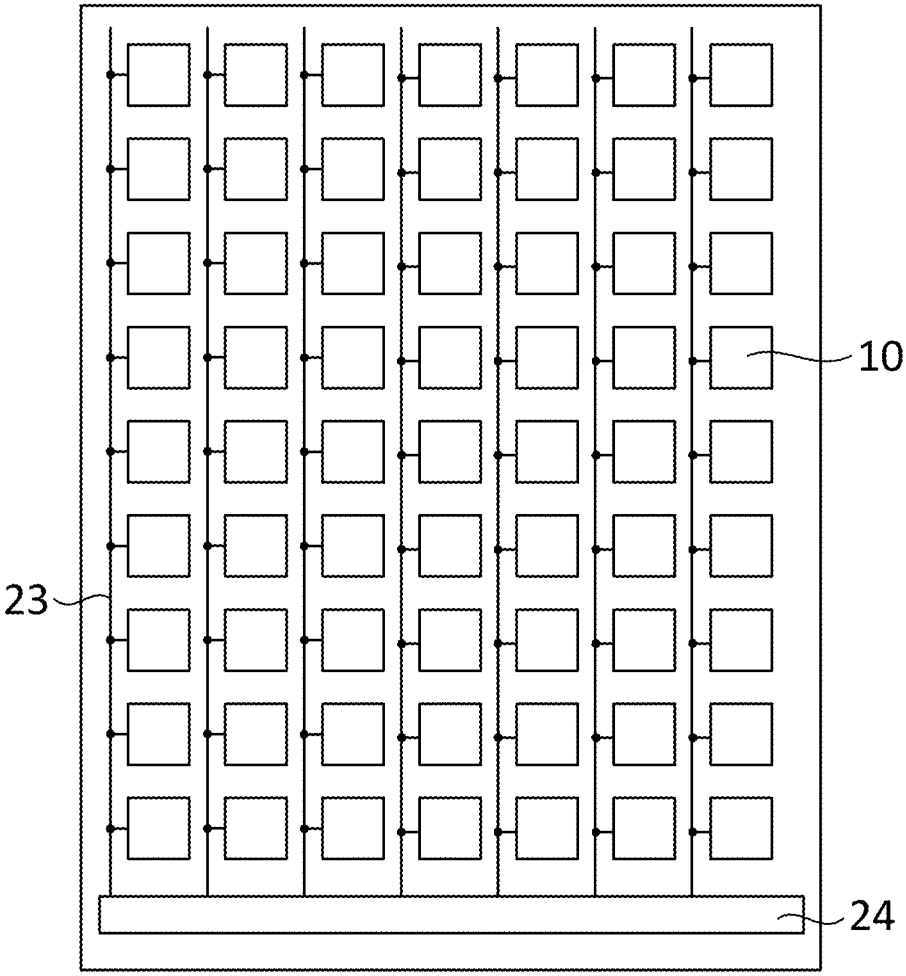
FIG. 6 is a structure diagram of another display panel according to an embodiment of the present disclosure.

FIG. 6 is a structure diagram of another display panel according to an embodiment of the present disclosure. As shown in FIG. 6, the plurality of pixel circuits 10 are arranged in an array, and a plurality of first data signal lines 23 extend in a column direction and are arranged in a row direction. Each first data signal line 23 may be correspondingly connected to one column of pixel circuits 10. Different first data signal lines 23 are connected to different columns of pixel circuits 10. The plurality of first data signal lines 23 are connected to a plurality of output pins of a driver chip 24 in one-to-one correspondence. The driver chip 24 is used for generating first data signals and outputting the first data signals to the plurality of first data signal lines 23. Different output pins of the driver chip 24 can output first data signals with different voltage values so that when drive transistors T0 in a row of pixel circuits 10 are turned on, the plurality of first data signal lines 23 can simultaneously provide first data signals with different voltages to all pixel circuits 10 in the row, that is, different first data signals are provided for different pixel circuits 10, thereby implementing separate control of each of the plurality of pixel circuits 10 and differentiated display.

In conclusion, in the display panel provided in the embodiment of the present disclosure, the boosting unit is disposed in the pixel circuit. The boosting unit is used for raising the voltage input from the first terminal of the boosting unit and outputting the raised voltage from the second terminal of the boosting unit. The first terminal of the boosting unit is electrically connected to the first data signal line for receiving the first data signal transmitted from the first data signal line, and the first data signal boosted by the boosting unit is output from the second terminal of the boosting unit. The second terminal of the boosting unit is electrically connected to the gate or the second electrode of the drive transistor to output the boosted first data signal to the gate or the second electrode of the drive transistor so that the transmission of the first data signal with a lower voltage by the first data signal line can implement the loading of a higher voltage at the gate or the second electrode of the drive transistor. In this manner, the requirement for a larger voltage interval at the gate or the second electrode of the drive transistor is met, and the voltage value of the first data signal transmitted on the first data signal line is reduced at the same time, thereby effectively reducing the IR drop of the first data signal line and reducing the overall power consumption.

With continued reference to FIGS. 4 and 5, the boosting unit 21 includes a first transistor T1, a second transistor T2 and a bootstrap capacitor C1, a gate g1 of the first transistor T1 is connected to a first scan signal line 25, the first scan signal line 25 receives a first scan signal, and a first electrode d1 of the first transistor T1 is connected to a first electrode c11 of the bootstrap capacitor C1. A gate g2 of the second transistor T2 is connected to a second scan signal line 26, the second scan signal line 26 receives a second scan signal, a first electrode d2 of the second transistor T2 is connected to a second electrode c12 of the bootstrap capacitor C1, and a second electrode s2 of the second transistor T2 is connected to a second electrode s1 of the first transistor T1. The second electrode s1 of the first transistor T1 is used as the first terminal 211 of the boosting unit 21, and the first electrode d1 of the first transistor T1 is used as the second terminal 212 of the boosting unit 21.

As shown in FIGS. 4 and 5, the gate g1 of the first transistor T1 is electrically connected to the first scan signal line 25 and receives the first scan signal provided by the first scan signal line 25. The first scan signal is used to enable the first transistor T1 to turn on. If the first transistor T1 is an n-type transistor, the first scan signal may be a high-level signal. If the first transistor T1 is a p-type transistor, the first scan signal may be a low-level signal.

The second electrode s1 of the first transistor T1 is used as the first terminal 211 of the boosting unit 21 and electrically connected to the first data signal line 23 for receiving the first data signal provided by the first data signal line 23.

The first electrode d1 of the first transistor T1 is electrically connected to the first electrode c11 of the bootstrap capacitor C1. When the first transistor T1 is turned on, the first transistor T1 transmits the first data signal provided by the first data signal line 23 to the first electrode c11 of the bootstrap capacitor C1.

The first electrode d1 of the first transistor T1 is also used as the second terminal 212 of the boosting unit 21. Therefore, the first electrode d1 of the first transistor T1 and the first electrode c11 of the bootstrap capacitor C1 are also electrically connected to the gate g0 or the second electrode s0 of the drive transistor T0.

The gate g2 of the second transistor T2 is electrically connected to the second scan signal line 26 for receiving the second scan signal provided by the second scan signal line 26. The second scan signal is used to enable the second transistor T2 to turn on. If the second transistor T2 is an n-type transistor, the second scan signal may be a high-level signal. If the second transistor T2 is a p-type transistor, the second scan signal may be a low-level signal.

The second electrode s2 of the second transistor T2 is electrically connected to the second electrode s1 of the first transistor T1. As the first terminal 211 of the boosting unit 21, the second electrode s1 of the first transistor T1 is electrically connected to the first data signal line 23. Therefore, the second electrode s2 of the second transistor T2 is also electrically connected to the first data signal line 23 for receiving the first data signal provided by the first data signal line 23.

The first electrode d2 of the second transistor T2 is connected to the second electrode c12 of the bootstrap capacitor C1. When the second transistor T2 is turned on, the second transistor T2 transmits the first data signal provided by the first data signal line 23 to the second electrode c12 of the bootstrap capacitor C1.

A working principle of the boosting unit 21 depends on alternating conduction between the first transistor T1 and the second transistor T2 and charging and discharging processes of the bootstrap capacitor C1. Under a particular timing, when the first scan signal and the second scan signal alternately trigger the first transistor T1 and the second transistor T2 to turn on, the bootstrap capacitor C1 can accumulate and maintain a potential difference higher than an input voltage at the two electrodes of the bootstrap capacitor C1 through bootstrap, thereby boosting the voltage.

The first transistor T1 can be controlled to turn on by the first scan signal line 25. The second transistor T2 can be controlled to turn on by the second scan signal line 26. Therefore, a turning-on opportunity and order of the first transistor T1 and the second transistor T2 can be controlled by the first scan signal line 25 and the second scan signal line 26.

Figure 7:
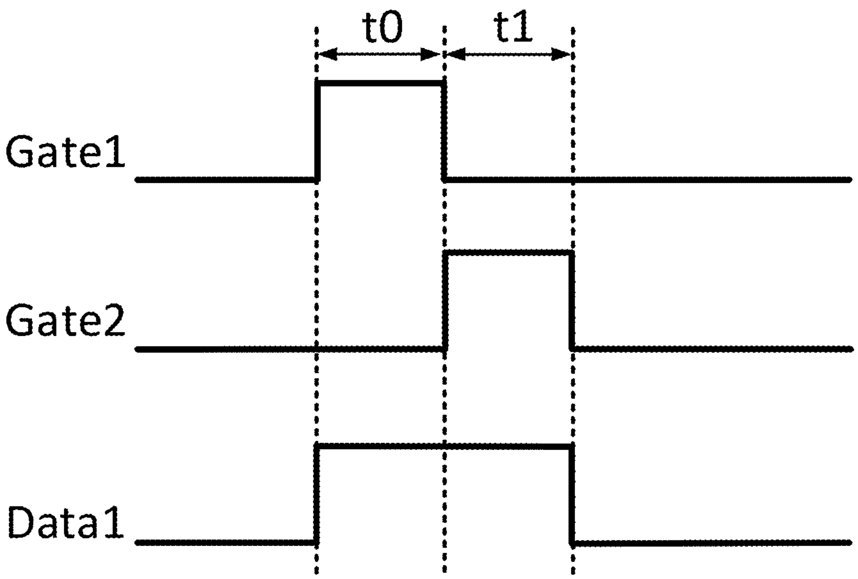
FIG. 7 is a drive timing diagram of a boosting unit according to an embodiment of the present disclosure.

FIG. 7 is a drive timing diagram of a boosting unit according to an embodiment of the present disclosure. As shown in FIG. 7, a boosting process may include the several stages in sequence described below.

In a charging stage t0, the first scan signal line 25 provides the first scan signal Gate1. In this case, the first transistor T1 is turned on, the second transistor T2 is turned off, and the first transistor T1 conducts between the second electrode s1 of the first transistor T1 and the first electrode d1 of the first transistor T1 so that the first data signal line 23 is connected to the first electrode c11 of the bootstrap capacitor C1 by the first transistor T1, the first data signal Data1 provided by the first data signal line 23 is applied to the first electrode c11 of the bootstrap capacitor C1 and a voltage at the first electrode c11 of the bootstrap capacitor C1 rises to the voltage of the first data signal Data1.

In a bootstrap stage t1, the second scan signal line 26 provides the second scan signal Gate2. In this case, the second transistor T2 is turned on, the first transistor T1 is turned off, and the second transistor T2 conducts the second electrode s2 of the second transistor T2 and the first electrode d2 of the second transistor T2 so that conduction between the first data signal line 23 and the second electrode c12 of the bootstrap capacitor C1 is permitted the second transistor T2, the first data signal Data1 provided by the first data signal line 23 is applied to the second electrode c12 of the bootstrap capacitor C1 and a voltage at the second electrode c12 of the bootstrap capacitor C1 rises to the voltage of the first data signal Data1. Since a voltage difference between the first electrode c11 and the second electrode c12 of the bootstrap capacitor C1 does not vary suddenly, a coupling variation occurs at the first electrode c11 of the bootstrap capacitor C1 due to a voltage variation of the second electrode c12 of the bootstrap capacitor C1 so that a bootstrap voltage higher than the voltage of the first data signal Data1 is generated at the first electrode c11 of the bootstrap capacitor C1, thereby implementing a boosting function of the boosting unit 21.

A voltage value of the generated bootstrap voltage is related to the voltage value of the first data signal Data1. For example, if the voltage value of the bootstrap voltage is two times the voltage value of the first data signal Data1, the voltage value output from the second terminal 212 of the boosting unit 21 is two times the voltage value of the first data signal Data1.

Further, as shown in FIGS. 4 and 5, the second terminal 212 of the boosting unit 21 is electrically connected to the gate g0 or the second electrode s0 of the drive transistor T0 to output the bootstrap voltage to the gate g0 or the second electrode s0 of the drive transistor T0 so that the transmission of the first data signal Data1 with a lower voltage by the first data signal line 23 can implement the loading of a higher voltage at the gate g0 or the second electrode s0 of the drive transistor T0. In this manner, the requirement for a larger voltage interval at the gate g0 or the second electrode s0 of the drive transistor T0 is met, and the voltage value of the first data signal Data1 transmitted on the first data signal line 23 is reduced at the same time, thereby effectively reducing the IR drop of the first data signal line 23 and reducing the overall power consumption.

It is to be noted that the structure of the boosting unit 21 is not limited to the preceding embodiment. In another embodiment, another boosting mechanism may also be used in the boosting unit 21 to implement the boosting function, which is not limited in the embodiments of the present disclosure.

With continued reference to FIG. 4, the second terminal 212 of the boosting unit 21 is connected to the gate g0 of the drive transistor T0, the second electrode s0 of the drive transistor T0 is connected to a second data signal line 27, and the second data signal line 27 is configured to receive a second data signal.

As shown in FIG. 4, the second terminal 212 of the boosting unit 21 is electrically connected to the gate g0 of the drive transistor T0. As described above, after the first data signal input from the first terminal 211 of the boosting unit 21 is boosted by the boosting unit 21, the first data signal generates a bootstrap voltage at the second terminal 212 of the boosting unit 21. A voltage value of the bootstrap voltage is two times the voltage value of the first data signal. The bootstrap voltage generated at the second terminal 212 of the boosting unit 21 is applied to the gate g0 of the drive transistor T0 so that the drive transistor T0 is controlled to turn on by the bootstrap voltage. In this manner, while the requirement for a larger voltage interval at the gate g0 of the drive transistor T0 is met, the voltage value of the first data signal transmitted on the first data signal line 23 can be reduced, thereby reducing the IR drop of the first data signal line 23 and reducing the power consumption.

Further, as shown in FIGS. 3 and 4, the second electrode s0 of the drive transistor T0 is electrically connected to the second data signal line 27 and receives the second data signal provided by the second data signal line 27. When the bootstrap voltage controls the drive transistor T0 to turn on, the drive transistor T0 conducts between the second electrode s0 of the drive transistor T0 and the first electrode d0 of the drive transistor T0 so that conduction between the second data signal line 27 and the pixel electrode 22 is permitted and the second data signal is written into the pixel electrode 22 by the drive transistor T0.

As shown in FIGS. 3 and 4, the electrophoretic display layer 34 and the common electrode layer 33 are stacked on the pixel electrode 22, and the electrophoretic display layer 34 includes electrophoretic particles of a plurality of colors. After the second data signal is written into the pixel electrode 22 by the drive transistor T0, the electric field is formed between the pixel electrode 22 and the common electrode layer 33. The electric field generates the attraction force or the repulsive force to the electrophoretic particles so that the electrophoretic particles move under the action of the electric field. As described above, electrophoretic particles of different colors carry different charges. Through writing different second data signals into the pixel electrode 22 by the second data signal line 27, electrophoretic particles carrying corresponding charges may move in the direction facing or facing away from the pixel electrode 22 so that positions of electrophoretic particles of different colors in the electrophoretic display layer 34 can be accurately controlled and electrophoretic particles of a plurality of colors simultaneously or partially appear on the surface of the electrophoretic display layer 34, thereby forming the color mixing and displaying the colored display effect.

Figure 8:
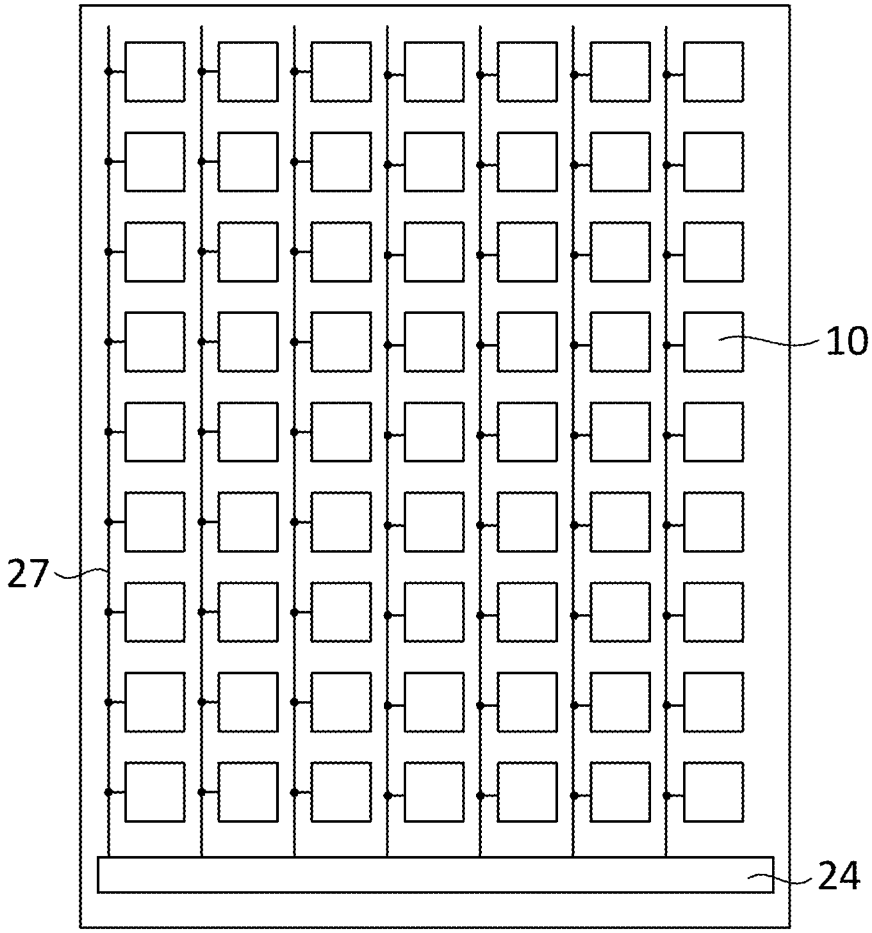
FIG. 8 is a structure diagram of another display panel according to an embodiment of the present disclosure.

FIG. 8 is a structure diagram of another display panel according to an embodiment of the present disclosure. As shown in FIG. 8, a plurality of pixel circuits 10 are arranged in an array, and a plurality of second data signal lines 27 extend in a column direction and are arranged in a row direction. Each second data signal line 27 may be correspondingly connected to one column of pixel circuits 10. Different second data signal lines 27 are connected to different columns of pixel circuits 10. The plurality of second data signal lines 27 are connected to a plurality of output pins of a driver chip 24 in one-to-one correspondence. The driver chip 24 is used for generating second data signals and outputting the second data signals to the plurality of second data signal lines 27. Different output pins of the driver chip 24 can output second data signals with different voltage values so that when drive transistors T0 in a row of pixel circuits 10 are turned on, the plurality of second data signal lines 27 can simultaneously provide second data signals with different voltages to all pixel circuits 10 in the row, that is, different second data signals are provided for different pixel circuits 10, thereby implementing the separate control of each of the plurality of pixel circuits 10 and the differentiated display.

Figure 9:
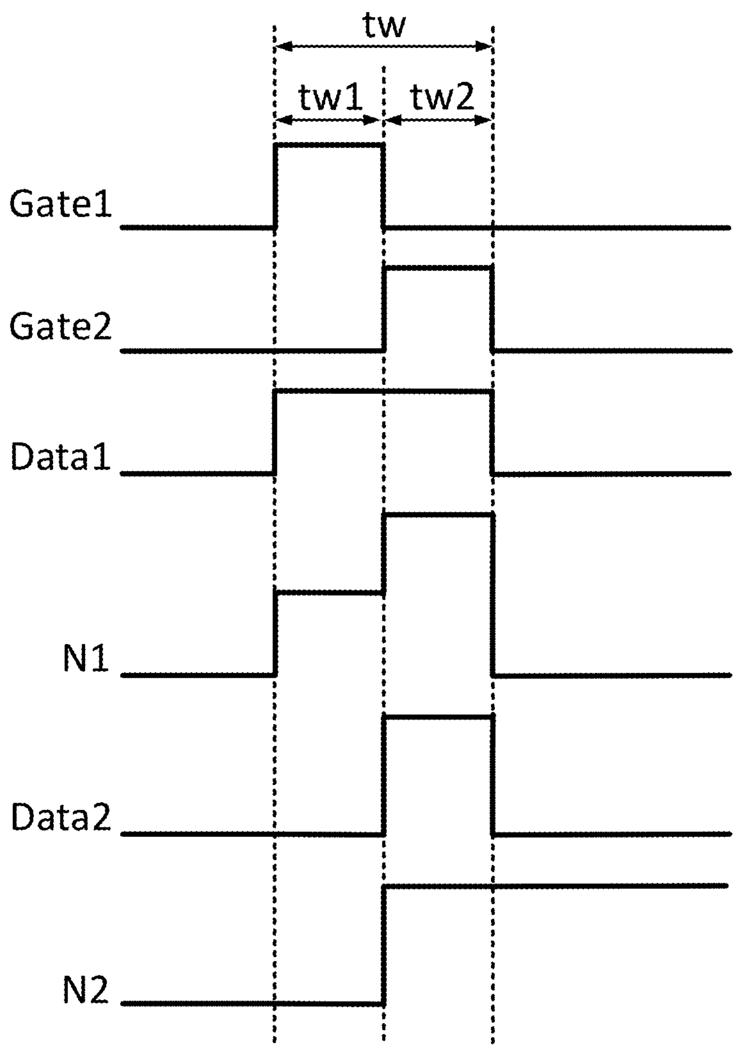
FIG. 9 is a drive timing diagram of a display panel according to an embodiment of the present disclosure.

FIG. 9 is a drive timing diagram of a display panel according to an embodiment of the present disclosure. As shown in FIGS. 4 and 9, a working period of the pixel circuit 10 includes a data write stage tw.

In the data write stage tw, the first data signal line 23 provides the first data signal Data1 to the first terminal 211 of the boosting unit 21.

The data write stage tw includes a first sub-stage tw1 and a second sub-stage tw2 in sequence.

In the first sub-stage tw1, the first scan signal line 25 provides the first scan signal Gate1 to the gate g1 of the first transistor T1. The first scan signal Gate1 is an effective pulse for controlling the first transistor T1 to turn on to write the first data signal Data1 into the gate g0 of the drive transistor T0.

In the second sub-stage tw2, the second scan signal line 26 provides the second scan signal Gate2 to the gate g2 of the second transistor T2. The second scan signal Gate2 is an effective pulse for controlling the second transistor T2 to turn on to increase the voltage of the gate g0 of the drive transistor T0.

As shown in FIGS. 4 and 9, the first electrode d1 of the first transistor T1, the first electrode c11 of the bootstrap capacitor C1 and the gate g0 of the drive transistor T0 are electrically connected at a first node N1, and the first electrode d0 of the drive transistor T0 is electrically connected to the pixel electrode 22 at a second node N2.

When the pixel circuit 10 is working, the first sub-stage tw1 and the second sub-stage tw2 are performed in sequence.

In the first sub-stage tw1, the first scan signal line 25 provides the first scan signal Gate1 to the gate g1 of the first transistor T1. The first scan signal Gate1 is an effective pulse for controlling the first transistor T1 to turn on. For example, when the first transistor T1 is an n-type transistor, the first scan signal Gate1 may be a high-level pulse signal, and when the first transistor T1 is a p-type transistor, the first scan signal Gate1 may be a low-level pulse signal. In FIG. 9, the first transistor T1 being the n-type transistor is used as an example for illustration but not limitations.

Further, the first scan signal Gate1 enables the first transistor T1 to turn on. In this case, the first transistor T1 conducts between the second electrode s1 of the first transistor T1 and the first electrode d1 of the first transistor T1, the second transistor T2 is turned off, the first data signal line 23 is connected to the first electrode c11 of the bootstrap capacitor C1 by the first transistor T1, and the first data signal Data1 provided by the first data signal line 23 is applied to the first electrode c11 of the bootstrap capacitor C1 so that the voltage at the first electrode c11 of the bootstrap capacitor C1 (a voltage at the first node N1) is the voltage of the first data signal Data1.

In the second sub-stage tw2, the second scan signal line 26 provides the second scan signal Gate2 to the gate g2 of the second transistor T2. The second scan signal Gate2 is an effective pulse for controlling the second transistor T2 to turn on. For example, when the second transistor T2 is an n-type transistor, the second scan signal Gate2 may be a high-level pulse signal, and when the second transistor T2 is a p-type transistor, the second scan signal Gate2 may be a low-level pulse signal. In FIG. 9, that the second transistor T2 is an n-type transistor is used as an example for illustration, but is not limited thereto.

Further, the second scan signal Gate2 enables the second transistor T2 to turn on. In this case, the second transistor T2 conducts between the second electrode s2 of the second transistor T2 and the first electrode d2 of the second transistor T2, the first transistor T1 is turned off, conduction between the first data signal line 23 and the second electrode c12 of the bootstrap capacitor C1 is permitted through the second transistor T2, the first data signal Data1 provided by the first data signal line 23 is applied to the second electrode c12 of the bootstrap capacitor C1, and the voltage at the second electrode c12 of the bootstrap capacitor C1 rises to the voltage of the first data signal Data1. Since the voltage difference between the first electrode c11 and the second electrode c12 of the bootstrap capacitor C1 does not vary suddenly, the coupling variation occurs at the first electrode c11 of the bootstrap capacitor C1 due to the voltage variation of the second electrode c12 of the bootstrap capacitor C1 so that the bootstrap voltage higher than the voltage of the first data signal Data1 is generated at the first electrode c11 of the bootstrap capacitor C1. The voltage value of the bootstrap voltage may be two times the voltage value of the first data signal Data1. In this case, the voltage value at the first node N1 rises to be two times the voltage value of the first data signal Data1, the drive transistor T0 is turned on, conduction between the second data signal line 27 and the pixel electrode 22 is permitted, and the second data signal Data2 provided by the second data signal line 27 is written into the second node N2 by the drive transistor T0 so that a voltage of the pixel electrode 22 (a voltage at the second node N2) is a voltage of the second data signal Data2, thereby forming the electric field between the pixel electrode 22 and the common electrode layer 33. Different second data signals are written into the pixel electrode 22 by the second data signal line 27 so that positions of electrophoretic particles of different colors between the pixel electrode 22 and the common electrode layer 33 in the electrophoretic display layer 34 can be accurately controlled and electrophoretic particles of a plurality of colors simultaneously or partially appear on the surface of the electrophoretic display layer 34, thereby forming the color mixing and displaying the colored display effect.

With continued reference to FIGS. 4 and 9, in the second sub-stage tw2, the second data signal line 27 provides the second data signal Data2 to the second electrode s0 of the drive transistor T0.

$$|(1/2)*data2| < |data1| < |data2|,$$

where data1 is the voltage of the first data signal Data1, and data2 is the voltage of the second data signal Data2.

|(1/2)*data2|<|data1| is set so that it can ensure that the drive transistor T0 is turned on in the second sub-stage tw2. Moreover, |data1|<|data2| is set so that a smaller voltage data1 of the first data signal Data1 transmitted on the first data signal line 23 can be ensured and the IR drop of the first data signal line 23 is smaller, thereby contributing to lowering the power consumption.

As shown in FIGS. 4 and 9, that the drive transistor T0 is an n-type transistor is used as an example for description. The second electrode s0 of the drive transistor T0 is a source. In the second sub-stage tw2, the voltage at the second electrode s0 of the drive transistor T0 is the voltage data2 of the second data signal Data2. The voltage of the gate g0 of the drive transistor T0 needs to be greater than the voltage data2 of the second data signal Data2 so that the drive transistor T0 can be turned on.

In the present embodiment, the voltage data1 of the first data signal Data1 is set to be at least half of the voltage data2 of the second data signal Data2 so that the voltage of the first data signal Data1 boosted by the boosting unit 21 exceeds the voltage data2 of the second data signal Data2 and in the second sub-stage tw2, the voltage written into the first node N1 (the voltage of the gate g0 of the drive transistor T0) is greater than the voltage data2 of the second data signal Data2. The voltage at the gate g0 of the drive transistor T0 is greater than the voltage of the second electrode s0 of the drive transistor T0 so that the drive transistor T0 can be turned on. In this case, the second data signal Data2 provided by the second data signal line 27 is written into the second node N2 by the drive transistor T0 to load the voltage data2 of the second data signal Data2 on the pixel electrode 22, thereby implementing a display function.

Further, when a voltage difference of the gate g0 of the drive transistor T0 relative to the second electrode s0 of the drive transistor T0 is greater than a threshold voltage Vth0 of the drive transistor T0, it can be ensured that the drive transistor T0 is turned on. Therefore, |2*data1−data2|≥|Vth0| may be further set, thereby contributing to enabling the drive transistor T0 to fully turn on in the second sub-stage tw2, accelerating a speed of writing the voltage data2 of the second data signal Data2 into the second node N2, shortening the charging time of the pixel electrode 22 and contributing to an improvement of the image refresh rate of the display panel. The threshold voltage Vth0 of the drive transistor T0 is a positive value, and the specific value of the threshold voltage Vth0 of the drive transistor T0 is determined by a process parameter of the drive transistor T0 and is not limited in the embodiments of the present disclosure.

It is to be noted that in the embodiment of the present disclosure, the drive transistor T0 being the n-type transistor only is used as an example for description, but is not limited thereto.

In another embodiment, the drive transistor T0 may also be a p-type transistor. In this case, the voltage of the gate g0 of the drive transistor T0 needs to be less than the voltage data2 of the second data signal Data2 so that the drive transistor T0 can be turned on. The voltage data1 of the first data signal Data1 is set to be less than half of the voltage data2 of the second data signal Data2 so that the voltage of the first data signal Data1 processed by the boosting unit 21 is less than the voltage data2 of the second data signal Data2 and in the second sub-stage tw2, the voltage written into the first node N1 (the voltage of the gate g0 of the drive transistor T0) is less than the voltage data2 of the second data signal Data2. The voltage of the gate g0 of the drive transistor T0 is less than the voltage of the second electrode s0 of the drive transistor T0 so that the drive transistor T0 can be turned on. In this case, the second data signal Data2 provided by the second data signal line 27 is written into the second node N2 by the drive transistor T0 to load the voltage data2 of the second data signal Data2 on the pixel electrode 22, thereby implementing the display function.

Further, when the voltage difference of the gate g0 of the drive transistor T0 relative to the second electrode s0 of the drive transistor T0 is less than the threshold voltage Vth0 of the drive transistor T0, it can be ensured that the drive transistor T0 is turned on. Therefore, |2*datal−data2|>|Vth0| may be further set, thereby contributing to enabling the drive transistor T0 to fully turn on in the second sub-stage tw2, accelerating the speed of writing the voltage data2 of the second data signal Data2 to the second node N2, shortening the charging time of the pixel electrode 22 and contributing to the improvement of the image refresh rate of the display panel. The threshold voltage Vth0 of the drive transistor T0 is a positive value. The specific value of the threshold voltage Vth0 of the drive transistor T0 is determined by the process parameter of the drive transistor T0 and is not limited in the embodiments of the present disclosure.

The voltage data1 of the first data signal Data1 corresponding to each pixel circuit 10 may be separately set according to the voltage data2 of the second data signal Data2 corresponding to the pixel circuit 10. When the voltage data1 of the first data signal Data1 corresponding to a pixel circuit 10 varies, the voltage data2 of the second data signal Data2 corresponding to the pixel circuit 10 may vary accordingly. That is, the voltage data1 of the first data signal Data1 of each pixel circuit 10 is separately controlled. The detailed control of the voltage data1 of the first data signal Data1 corresponding to each pixel circuit 10 can ensure that each pixel circuit 10 can work normally, and at the same time, the voltage data1 of the first data signal Data1 corresponding to each pixel circuit 10 can be reduced as much as possible, thereby reducing the IR drop of the first data signal line 23 and reducing the power consumption.

With continued reference to FIG. 5, the second terminal 212 of the boosting unit 21 is connected to the second electrode s0 of the drive transistor T0, the gate g0 of the drive transistor T0 is connected to a third scan signal line 28, and the third scan signal line 28 is configured to receive a third scan signal.

As shown in FIG. 5, the second terminal 212 of the boosting unit 21 is electrically connected to the second electrode s0 of the drive transistor T0. As described above, after the first data signal input from the first terminal 211 of the boosting unit 21 is boosted by the boosting unit 21, the bootstrap voltage is generated at the second terminal 212 of the boosting unit 21. The voltage value of the bootstrap voltage is two times the voltage value of the first data signal. The bootstrap voltage generated at the second electrode 212 of the boosting unit 21 is applied to the second electrode s0 of the drive transistor T0.

Further, as shown in FIG. 5, the gate g0 of the drive transistor T0 is electrically connected to the third scan signal line 28 and receives the third scan signal provided by the third scan signal line 28. The third scan signal is used for controlling the drive transistor T0 to turn on. When the third scan signal controls the drive transistor T0 to turn on, the drive transistor T0 conducts between the second electrode s0 of the drive transistor T0 and the first electrode d0 of the drive transistor T0, and the bootstrap voltage is written into the pixel electrode 22 by the drive transistor T0.

In the display panel provided in the embodiment of the present disclosure, while the requirement for a larger voltage interval on the pixel electrode 22 is met, the voltage value of the first data signal transmitted on the first data signal line 23 can be reduced, thereby reducing the IR drop of the first data signal line 23 and reducing the power consumption.

Figure 10:
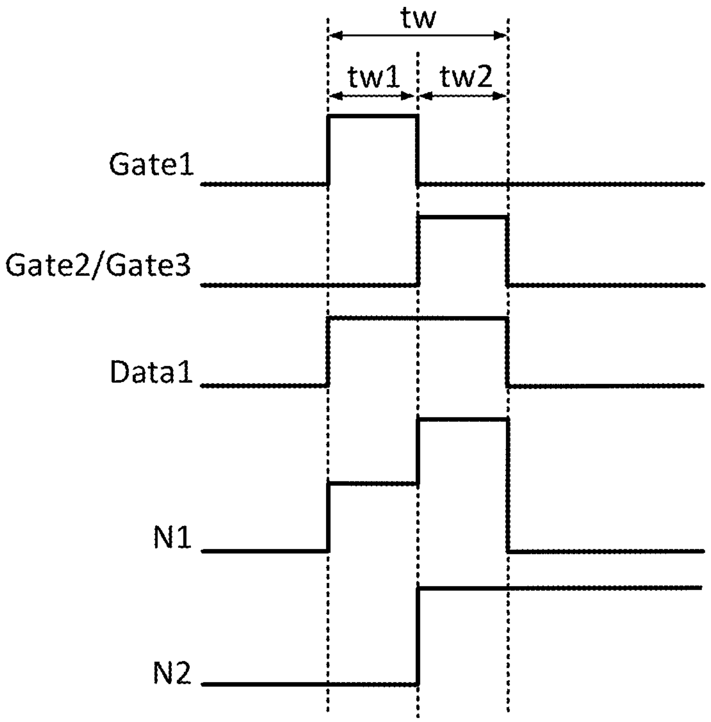
FIG. 10 is another drive timing diagram of a display panel according to an embodiment of the present disclosure.

FIG. 10 is another drive timing diagram of a display panel according to an embodiment of the present disclosure. As shown in FIGS. 5 and 10, a working period of the pixel circuit 10 includes a data write stage tw.

In the data write stage tw, the first data signal line 23 provides the first data signal Data1 to the first terminal 211 of the boosting unit 21.

The data write stage tw includes a first sub-stage tw1 and a second sub-stage tw2 in sequence.

In the first sub-stage tw1, the first scan signal line 25 provides the first scan signal Gate1 to the gate g1 of the first transistor T1. The first scan signal Gate1 is an effective pulse for controlling the first transistor T1 to turn on to write the first data signal Data1 into the second electrode s0 of the drive transistor T0.

In the second sub-stage tw2, the second scan signal line 26 provides the second scan signal Gate2 to the gate g2 of the second transistor T2. The second scan signal Gate2 is an effective pulse for controlling the second transistor T2 to turn on to increase the voltage of the second electrode s0 of the drive transistor T0.

As shown in FIGS. 5 and 10, the first electrode d1 of the first transistor T1, the first electrode c11 of the bootstrap capacitor C1 and the second electrode s0 of the drive transistor T0 are electrically connected at a first node N1, and the first electrode d0 of the drive transistor T0 is electrically connected to the pixel electrode 22 at a second node N2.

When the pixel circuit 10 is working, the first sub-stage tw1 and the second sub-stage tw2 are performed in sequence.

In the first sub-stage tw1, the first scan signal line 25 provides the first scan signal Gate1 to the gate g1 of the first transistor T1. The first scan signal Gate1 is an effective pulse for controlling the first transistor T1 to turn on. For example, when the first transistor T1 is an n-type transistor, the first scan signal Gate1 may be a high-level pulse signal, and when the first transistor T1 is a p-type transistor, the first scan signal Gate1 may be a low-level pulse signal. In FIG. 10, that the first transistor T1 is an n-type transistor is used as an example for illustration, but is not limited thereto.

Further, the first scan signal Gate1 enables the first transistor T1 to turn on. In this case, the first transistor T1 conducts between the second electrode s1 of the first transistor T1 and the first electrode d1 of the first transistor T1, conduction between the second transistor T2 is turned off, the first data signal line 23 and the first electrode c11 of the bootstrap capacitor C1 is permitted through the first transistor T1, and the first data signal Data1 provided by the first data signal line 23 is applied to the first electrode c11 of the bootstrap capacitor C1 so that the voltage at the first electrode c11 of the bootstrap capacitor C1 (the voltage at the first node N1) is the voltage of the first data signal Data1.

In the second sub-stage tw2, the second scan signal line 26 provides the second scan signal Gate2 to the gate g2 of the second transistor T2, and the third scan signal line 28 provides the third scan signal Gate3 to the gate g0 of the drive transistor T0.

The second scan signal Gate2 is an effective pulse for controlling the second transistor T2 to turn on. For example, when the second transistor T2 is an n-type transistor, the second scan signal Gate2 may be a high-level pulse signal, and when the second transistor T2 is a p-type transistor, the second scan signal Gate2 may be a low-level pulse signal. In FIG. 10, that the second transistor T2 is an n-type transistor is used as an example for illustration, but is not limited thereto.

The third scan signal Gate3 is an effective pulse for controlling the drive transistor T0 to turn on. For example, when the drive transistor T0 is an n-type transistor, the third scan signal Gate3 may be a high-level pulse signal, and when the drive transistor T0 is a p-type transistor, the third scan signal Gate3 may be a low-level pulse signal. In FIG. 10, that the drive transistor T0 is an n-type transistor is used as an example for illustration, but is not limited thereto.

Further, the second scan signal Gate2 enables the second transistor T2 to turn on, and the third scan signal Gate3 enables the drive transistor T0 to turn on. In this case, the second transistor T2 conducts between the second electrode s2 of the second transistor T2 and the first electrode d2 of the second transistor T2, the first transistor T1 is turned off, conduction between the first data signal line 23 and the second electrode c12 of the bootstrap capacitor C1 is permitted through the second transistor T2, the first data signal Data1 provided by the first data signal line 23 is applied to the second electrode c12 of the bootstrap capacitor C1, and the voltage at the second electrode c12 of the bootstrap capacitor C1 rises to the voltage of the first data signal Data1. Since the voltage difference between the first electrode c11 and the second electrode c12 of the bootstrap capacitor C1 does not vary suddenly, the coupling variation occurs at the first electrode c11 of the bootstrap capacitor C1 due to the voltage variation of the second electrode c12 of the bootstrap capacitor C1 so that the bootstrap voltage higher than the voltage of the first data signal Data1 is generated at the first electrode c11 of the bootstrap capacitor C1. The voltage value of the bootstrap voltage may be two times the voltage value of the first data signal Data1 so that the voltage value at the first node N1 rises to be two times the voltage value of the first data signal Data1.

The drive transistor T0 conducts between the second electrode s0 of the drive transistor T0 and the first electrode d0 of the drive transistor T0. The bootstrap voltage is written into the second node N2 by the drive transistor T0 so that the voltage of the pixel electrode 22 (the voltage at the second node N2) is two times the voltage value of the first data signal Data1, thereby forming the electric field between the pixel electrode 22 and the common electrode layer 33. Different first data signals are applied to the first node N1 by the first data signal line 23 so that different bootstrap voltages can be written into the pixel electrode 22, positions of electrophoretic particles of different colors between the pixel electrode 22 and the common electrode layer 33 in the electrophoretic display layer 34 can be accurately controlled and electrophoretic particles of a plurality of colors simultaneously or partially appear on the surface of the electrophoretic display layer 34, thereby forming the color mixing and displaying the colored display effect.

The voltage of the first scan signal Gate1 is gate1, the voltage of the second scan signal Gate2 is gate2, and the voltage of the first data signal Data1 is data1, where $|gate1|>|data1|$, and $|gate2|>|data1|$.

Setting $|gate1|>|data1|$ facilitates ensuring that when the first scan signal Gate1 is loaded at the gate g1 of the first transistor T1, the first transistor T1 can be turned on. Setting $gate2|>|data1|$ facilitates ensuring that when the second scan signal Gate2 is loaded at the gate g2 of the second transistor T2, the second transistor T2 can be turned on.

As shown in FIGS. 4, 5, 9 and 10, that both the first transistor T1 and the second transistor T2 are n-type transistors is used as an example for description. The second electrode s1 of the first transistor T1 is the source and receives the first data signal Data1. A voltage of the second electrode s1 of the first transistor T1 is the voltage data1 of the first data signal Data1. When the voltage of the gate g1 of the first transistor T1 is greater than the voltage of the second electrode s1 of the first transistor T1, the first transistor T1 can be turned on. Therefore, setting the voltage gate1 of the first scan signal Gate1 to be greater than the voltage data1 of the first data signal Data1 facilitates ensuring that when the first scan signal Gate1 is loaded at the gate g1 of the first transistor T1, the first transistor T1 can be turned on.

Further, when a voltage difference of the gate g1 of the first transistor T1 relative to the second electrode s1 of the first transistor T1 is greater than a threshold voltage Vth1 of the first transistor T1, it can be ensured that the first transistor T1 is turned on. Therefore, $|gate1-data1|>|Vth1|$ may be further set, thereby contributing to ensuring that the first transistor T1 can be fully turned on. In this case, the threshold voltage Vth1 of the first transistor T1 is a positive value. A specific value of the threshold voltage Vth1 of the first transistor T1 is determined by a process parameter of the first transistor T1 and is not limited in the embodiments of the present disclosure.

Similarly, the second electrode s2 of the second transistor T2 is the source and receives the first data signal Data1. A voltage of the second electrode s2 of the second transistor T2 is the voltage data1 of the first data signal Data1. When a voltage of the gate g2 of the second transistor T2 is greater than the voltage of the second electrode s2 of the second transistor T2, the second transistor T2 can be turned on. Therefore, setting the voltage gate2 of the second scan signal Gate2 to be greater than the voltage data1 of the first data signal Data1 facilitates ensuring that when the second scan signal Gate2 is loaded at the gate g2 of the second transistor T2, the second transistor T2 can be turned on.

Further, when a voltage difference of the gate g2 of the second transistor T2 relative to the second electrode s2 of the second transistor T2 is greater than a threshold voltage Vth2 of the second transistor T2, it can be ensured that the second transistor T2 is turned on. Therefore, $|gate2-data1|\geq|Vth2|$ may be further set, thereby contributing to enabling the second transistor T2 to fully turn on. In this case, the threshold voltage Vth2 of the second transistor T2 is a positive value. A specific value of the threshold voltage Vth2 of the second transistor T2 is determined by a process parameter of the second transistor T2 and is not limited in the embodiment of the present disclosure.

In another embodiment, the first transistor T1 and the second transistor T2 may also be p-type transistors. In this case, when the voltage of the gate g1 of the first transistor T1 is less than the voltage of the second electrode s1 of the first transistor T1, the first transistor T1 can be turned on. Therefore, setting the voltage gate1 of the first scan signal Gate1 to be less than the voltage data1 of the first data signal Data1 facilitates ensuring that when the first scan signal Gate1 is loaded at the gate g1 of the first transistor T1, the first transistor T1 can be turned on.

Further, when the voltage difference of the gate g1 of the first transistor T1 relative to the second electrode s1 of the first transistor T1 is less than the threshold voltage Vth1 of the first transistor T1, it can be ensured that the first transistor T1 is turned on. Therefore, $|gate1-data1|\geq|Vth1|$ may be further set, thereby contributing to ensuring that the first transistor T1 can be fully turned on. In this case, the threshold voltage Vth1 of the first transistor T1 is a negative value. The specific value of the threshold voltage Vth1 of the first transistor T1 is determined by the process parameter of the first transistor T1 and is not limited in the embodiments of the present disclosure.

Similarly, when the voltage of the gate g2 of the second transistor T2 is less than the voltage of the second electrode s2 of the second transistor T2, the second transistor T2 can be turned on. Therefore, setting the voltage gate2 of the second scan signal Gate2 to be less than the voltage data1 of the first data signal Data1 facilitates ensuring that when the second scan signal Gate2 is loaded at the gate g2 of the second transistor T2, the second transistor T2 can be turned on.

Further, when a voltage difference of the second electrode s2 of the second transistor T2 relative to the gate g2 of the second transistor T2 is greater than the threshold voltage Vth2 of the second transistor T2, it can be ensured that the second transistor T2 is turned on. Therefore, $|gate2-data1|\geq|Vth2|$ may be further set, thereby contributing to ensuring that the second transistor T2 can be fully turned on. In this case, the threshold voltage Vth2 of the second transistor T2 is a negative value. The specific value of the threshold voltage Vth2 of the second transistor T2 is determined by the process parameter of the second transistor T2 and is not limited in the embodiments of the present disclosure.

With continued reference to FIGS. 5 and 10, the third scan signal line 28 and the second scan signal line 26 are the same signal line.

As shown in FIGS. 5 and 10, the second transistor T2 and the drive transistor T0 may be transistors of the same type. For example, both the second transistor T2 and the drive transistor T0 are n-type transistors, or both the second transistor T2 and the drive transistor T0 are p-type transistors. In this case, the second scan signal Gate2 for controlling the second transistor T2 to turn on and the third scan signal Gate3 for controlling the drive transistor T0 to turn on may be the same signal.

Further, the third scan signal line 28 and the second scan signal line 26 are the same signal line so that the second transistor T2 and the drive transistor T0 are controlled to turn on in the second sub-stage tw2 at the same time, the number of signal lines can be reduced, thereby saving the space and cost and contributing to a decrease in wiring complexity.

Figure 11:
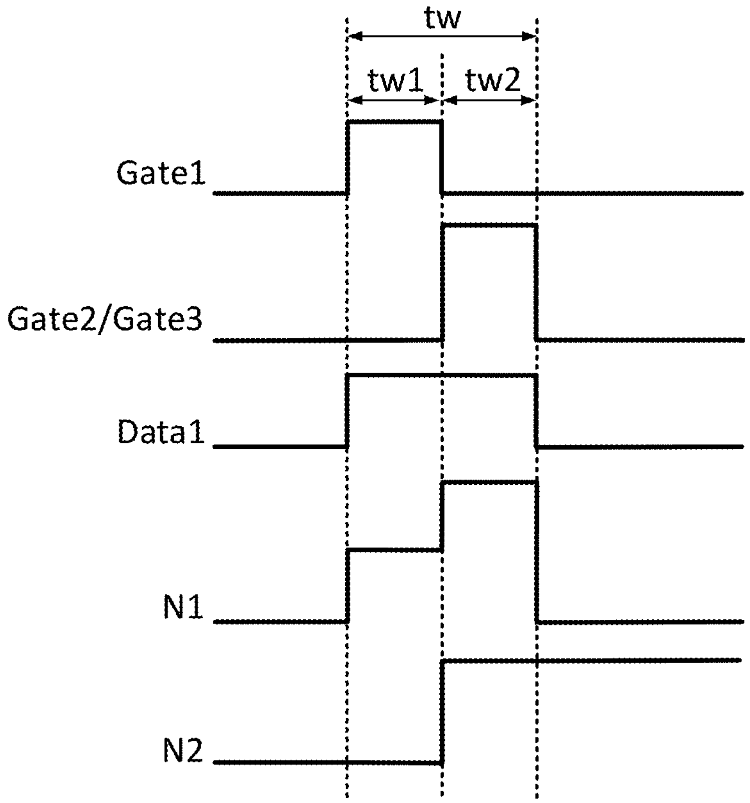
FIG. 11 is another drive timing diagram of a display panel according to an embodiment of the present disclosure.

FIG. 11 is another drive timing diagram of a display panel according to an embodiment of the present disclosure. As shown in FIG. 11, the voltage of the first scan signal Gate1 is gate1, and the voltage of the second scan signal Gate2 is gate2, where the maximum value of |gate2| is greater than the maximum value of |gate1|.

The voltage gate1 of the first scan signal Gate1 is set to be within a voltage interval of a smaller range so that the first scan signal Gate1 with a lower voltage can be transmitted on the first scan signal line 25, thereby reducing an IR drop of the first scan signal line 25 and reducing power consumption.

Moreover, the third scan signal line 28 and the second scan signal line 26 are the same signal line, and the voltage gate2 of the second scan signal Gate2 and the voltage gate3 of the third scan signal Gate3 have the same voltage value. Setting the voltage gate2 of the second scan signal Gate2 to be within a voltage interval of a larger range can ensure that both the second transistor T2 and the drive transistor T0 can be turned on in the second sub-stage tw2.

The case where each of the first transistor T1, the second transistor T2 and the drive transistor T0 is an n-type transistor is used as an example for description. The voltage gate1 of the first scan signal Gate1 is greater than the voltage data1 of the first data signal Data1. For example, $|gate1-data1| \geq |Vth1|$ can ensure that the first transistor T1 is turned on, where Vth1 is the threshold voltage of the first transistor T1.

The voltage gate2 of the second scan signal Gate2 is greater than the voltage data1 of the first data signal Data1. For example, $|gate2-data1| \geq |Vth2|$ can ensure that the second transistor T2 is turned on, where Vth2 is the threshold voltage of the second transistor T2.

As shown in FIG. 5, the voltage gate3 of the third scan signal Gate3 is greater than the voltage of the second electrode s0 of the drive transistor T0. For example, $|gate3-2*data1| \geq |Vth0|$ can ensure that the drive transistor T0 is turned on, where Vth0 is the threshold voltage of the drive transistor T0, and 2*data1 is the voltage of the second electrode s0 of the drive transistor T0 (the voltage at the first node N1).

Therefore, the voltage gate1 of the first scan signal Gate1 and the voltage gate2 of the second scan signal Gate2 only need to be greater than the voltage data1 of the first data signal Data1 so that the first transistor T1 and the second transistor T2 can be controlled to turn on. The voltage gate3 of the third scan signal Gate3 needs to be greater than two times the voltage data1 of the first data signal Data1 so that the drive transistor T0 can be controlled to turn on.

In the present embodiment, the third scan signal line 28 and the second scan signal line 26 are the same signal line, and the voltage gate2 of the second scan signal Gate2 and the voltage gate3 of the third scan signal Gate3 have the same voltage value. The voltage gate2 of the second scan signal Gate2 is set to be greater than the voltage gate1 of the first scan signal Gate1 (for example, the voltage gate2 of the second scan signal Gate2 is set to be greater than two times the voltage data1 of the first data signal Data1), thereby ensuring that both the second transistor T2 and the drive transistor T0 can be turned on in the second sub-stage tw2.

For example, if the voltage of the first node N1 needs to meet the voltage interval of ±28 V and the voltage of the gate g0 of the drive transistor T0 needs to meet the voltage interval of ±38 V, the voltage data1 of the first data signal Data1 needs to meet a voltage interval of ±14 V. In this case, a range of the voltage gate1 of the first scan signal Gate1 may be a voltage interval of ±14 V at the lowest, and a range of the voltage gate2 of the second scan signal Gate2 may be a voltage interval of ±38 V at the lowest.

Figure 12:
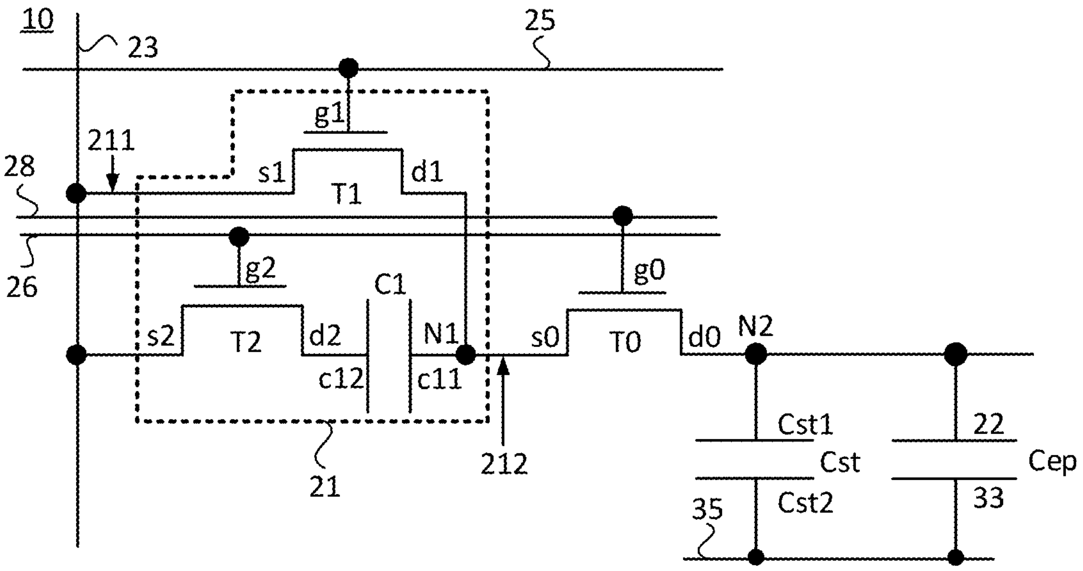
FIG. 12 is a structure diagram of another pixel circuit according to an embodiment of the present disclosure.
Figure 13:
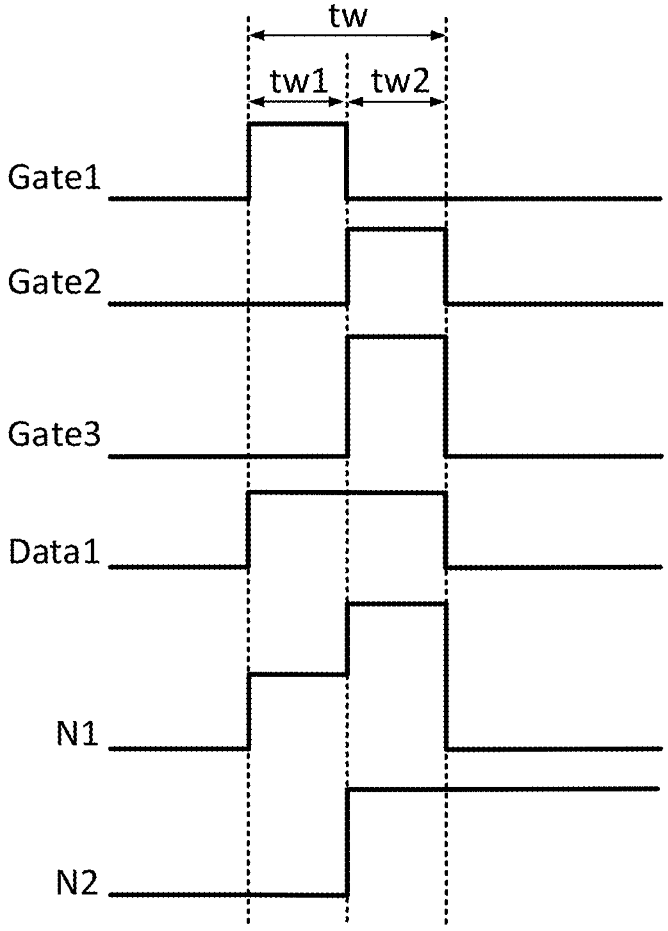
FIG. 13 is another drive timing diagram of a display panel according to an embodiment of the present disclosure.

FIG. 12 is a structure diagram of another pixel circuit according to an embodiment of the present disclosure. FIG. 13 is a drive timing diagram of another display panel according to an embodiment of the present disclosure. As shown in FIGS. 12 and 13, the third scan signal line 28 and the second scan signal line 26 may also be different signal lines. In this case, the voltage gate2 of the second scan signal Gate2 and the voltage gate3 of the third scan signal Gate3 may have different voltage values, and the voltage gate2 of the second scan signal Gate2 and the voltage gate1 of the first scan signal Gate1 may have the same voltage value. For example, the voltage gate2 of the second scan signal Gate2 and the voltage gate1 of the first scan signal Gate1 each have a lower voltage value so that the first scan signal Gate1 with a lower voltage range and the second scan signal Gate2 with a lower voltage range can be transmitted on the first scan signal line 25 and the second scan signal line 26, respectively, thereby contributing to reducing IR drops of the first scan signal line 25 and the second scan signal line 26 and reducing the power consumption.

Further, the voltage gate3 of the third scan signal Gate3 meets that the maximum value of |gate3| is greater than the maximum value of |gate2| to ensure that the drive transistor T0 can be turned on in the second sub-stage tw2.

For example, if the voltage of the first node N1 needs to meet the voltage interval of ±28 V and the voltage of the gate g0 of the drive transistor T0 needs to meet the voltage interval of ±38 V, the voltage data1 of the first data signal Data1 needs to meet a voltage interval of ±14 V. In this case, the range of the voltage gate1 of the first scan signal Gate1 may be the voltage interval of ±14 V at the lowest, the range of the voltage gate2 of the second scan signal Gate2 may be the voltage interval of ±14 V at the lowest, and the range of the voltage gate3 of the third scan signal Gate3 may be the voltage interval of ±38 V at the lowest.

Figure 14:
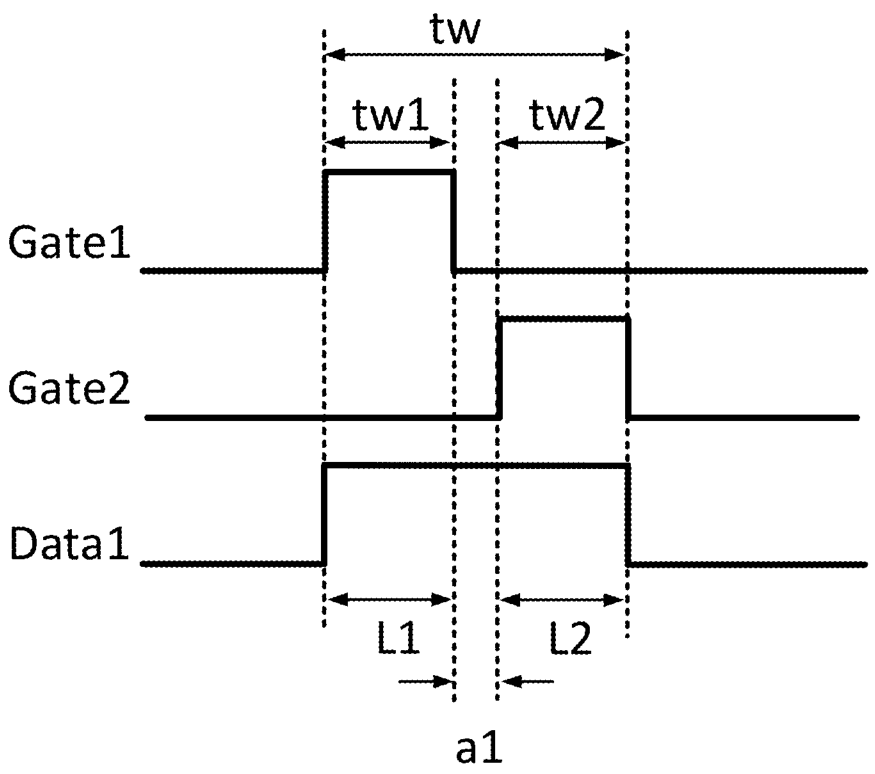
FIG. 14 is another drive timing diagram of a display panel according to an embodiment of the present disclosure.

FIG. 14 is another drive timing diagram of a display panel according to an embodiment of the present disclosure. As shown in FIG. 14, in the same data write stage tw, interval time between an end moment of the first scan signal Gate1 and a start moment of the second scan signal Gate2 is greater than 0.

As shown in FIG. 14, that the effective pulse is a high-level pulse signal is used as an example for description. The end moment of the first scan signal Gate1 is a moment where the falling edge of the first scan signal Gate1 is located. The start moment of the second scan signal Gate2 is a moment where the rising edge of the second scan signal Gate2 is located.

It is to be understood that if the effective pulse is a low-level pulse signal, the end moment of the first scan signal Gate1 is a moment where the rising edge of the first scan signal Gate1 is located and the start moment of the second scan signal Gate2 is a moment where the falling edge of the second scan signal Gate2 is located.

In an actual situation, the first scan signal Gate1 and the second scan signal Gate2 may not be ideal square wave signals, and certain transition time (edge delays) may exist on the rising edges and the falling edges of the first scan signal Gate1 and the second scan signal Gate2. Moreover, the transistors are also not instantaneously turned on or off, and certain switch delays exist. Therefore, as shown in FIGS. 4, 5 and 14, in the same data write stage tw, setting the time interval al between the end moment of the first scan signal Gate1 and the start moment of the second scan signal Gate2 to be greater than 0 facilitates reliable switching of working states of the first transistor T1 and the second transistor T2. After the first transistor T1 is completely turned off, the second scan signal Gate2 controls the second transistor T2 to turn on, thereby avoiding that when the second transistor T2 is turned on, the first transistor T1 is still in an on state and the charging and discharging processes of the bootstrap capacitor are affected, thus avoiding affecting a bootstrap effect of the voltage at the first electrode c11 of the bootstrap capacitor C1 (the voltage at the first node N1) and ensuring the stable and accurate operation of the boosting unit 21.

It is to be noted that the interval time al between the end moment of the first scan signal Gate1 and the start moment of the second scan signal Gate2 may be set according to an actual requirement. The interval time al may be set at a microsecond level, for example, $0<a1\leq 100$ μs, thereby facilitating an improvement of the operating frequency and overall response speed of the pixel circuit and thus facilitating an improvement on the refresh rate of the display panel.

Figure 15:
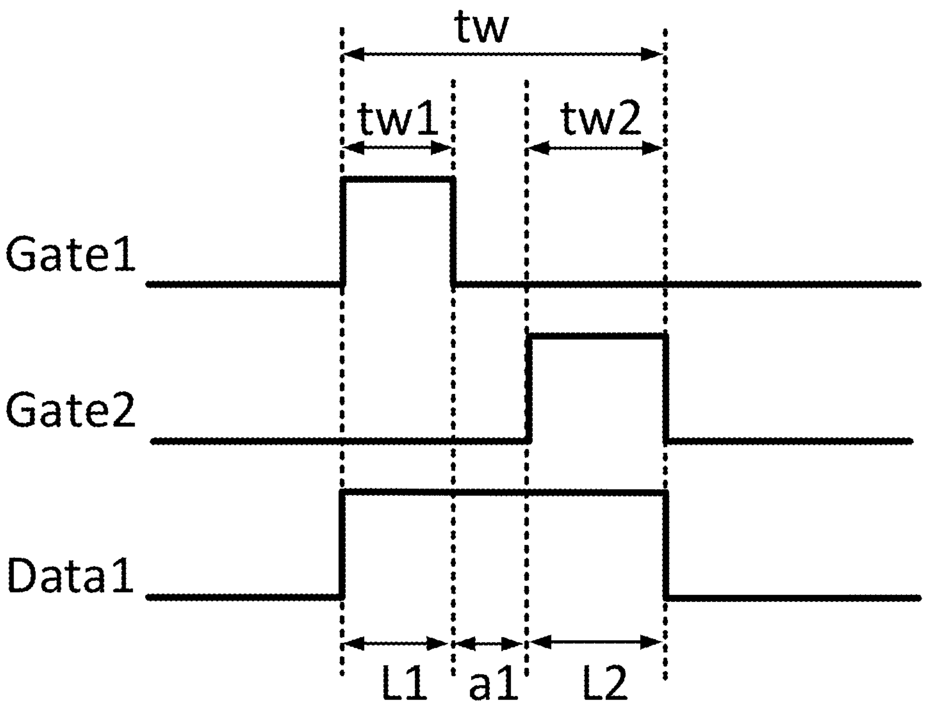
FIG. 15 is another drive timing diagram of a display panel according to an embodiment of the present disclosure.

FIG. 15 is another drive timing diagram of a display panel according to an embodiment of the present disclosure. As shown in FIGS. 14 and 15, in the same data write stage tw, duration L1 of the first scan signal Gate1 is less than or equal to duration L2 of the second scan signal Gate2.

As shown in FIG. 14, the duration L1 of the first scan signal Gate1 may be equal to the duration L2 of the second scan signal Gate2 so that the implementation of a scanning circuit is relatively simple, no complex timing control logic is needed and the scanning circuit is easy to implement and debug.

In another embodiment, as shown in FIGS. 4, 5 and 15, the duration L1 of the first scan signal Gate1 may also be less than the duration L2 of the second scan signal Gate2. The duration L2 of the second scan signal Gate2 is longer so that more sufficient bootstrap time can be provided to the bootstrap capacitor C1 to ensure that the bootstrap capacitor C1 completes the bootstrap charging process and the first electrode c11 of the bootstrap capacitor C1 reaches a required bootstrap voltage, thereby ensuring that the boosting unit 21 works accurately and reliably. Moreover, setting the duration L1 of the first scan signal Gate1 to be shorter facilitates an improvement of the operating frequency and overall response speed of the pixel circuit and facilitates the improvement of the refresh rate of the display panel.

Figure 16:
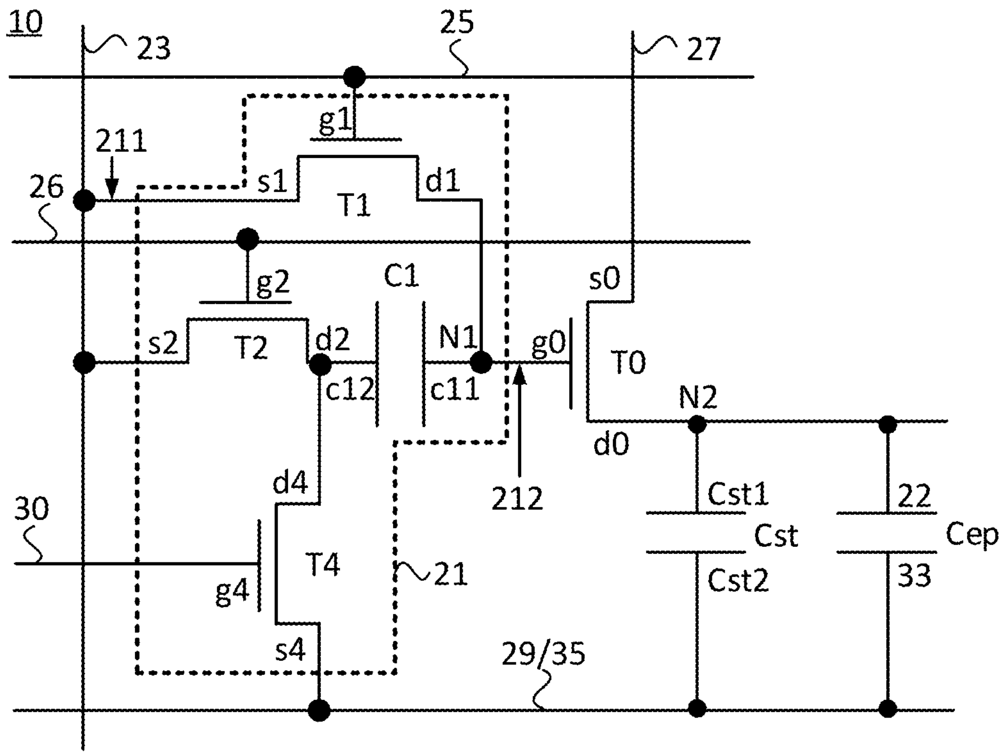
FIG. 16 is a structure diagram of another pixel circuit according to an embodiment of the present disclosure.
Figure 17:
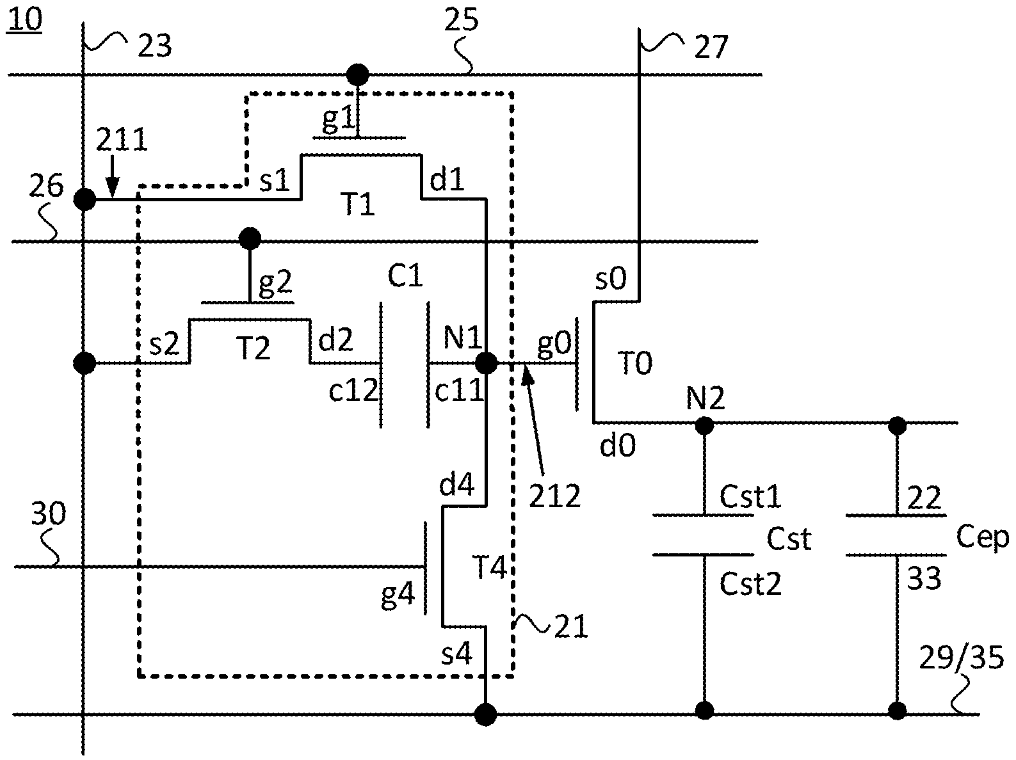
FIG. 17 is a structure diagram of another pixel circuit according to an embodiment of the present disclosure.
Figure 18:
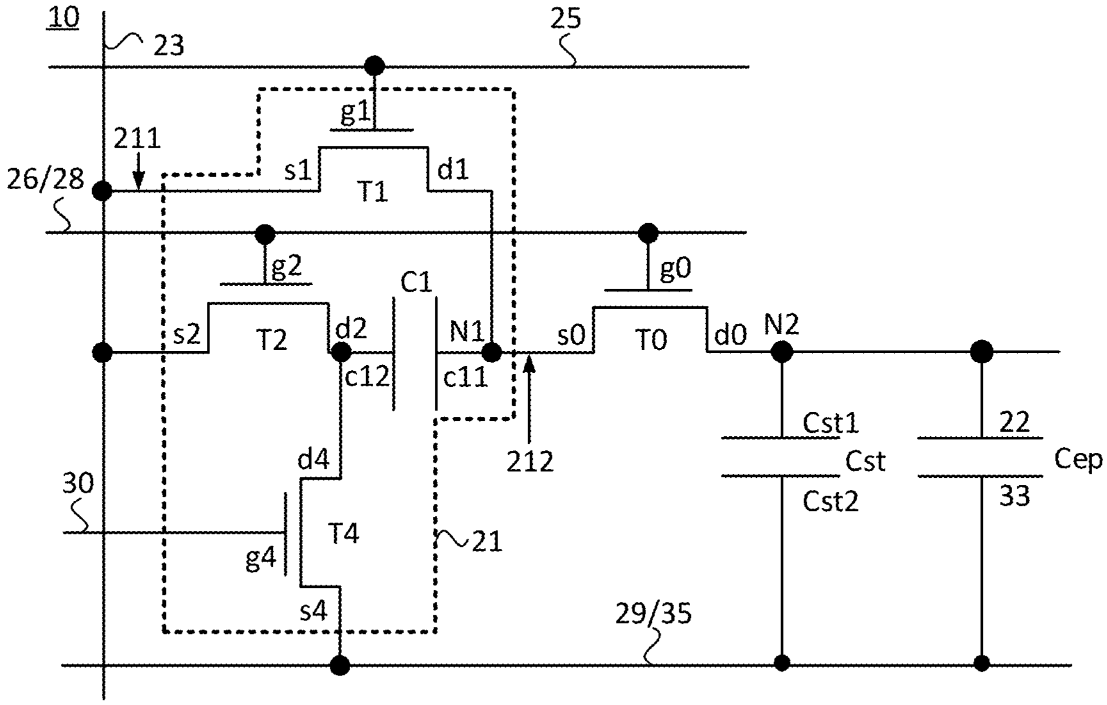
FIG. 18 is a structure diagram of another pixel circuit according to an embodiment of the present disclosure.
Figure 19:
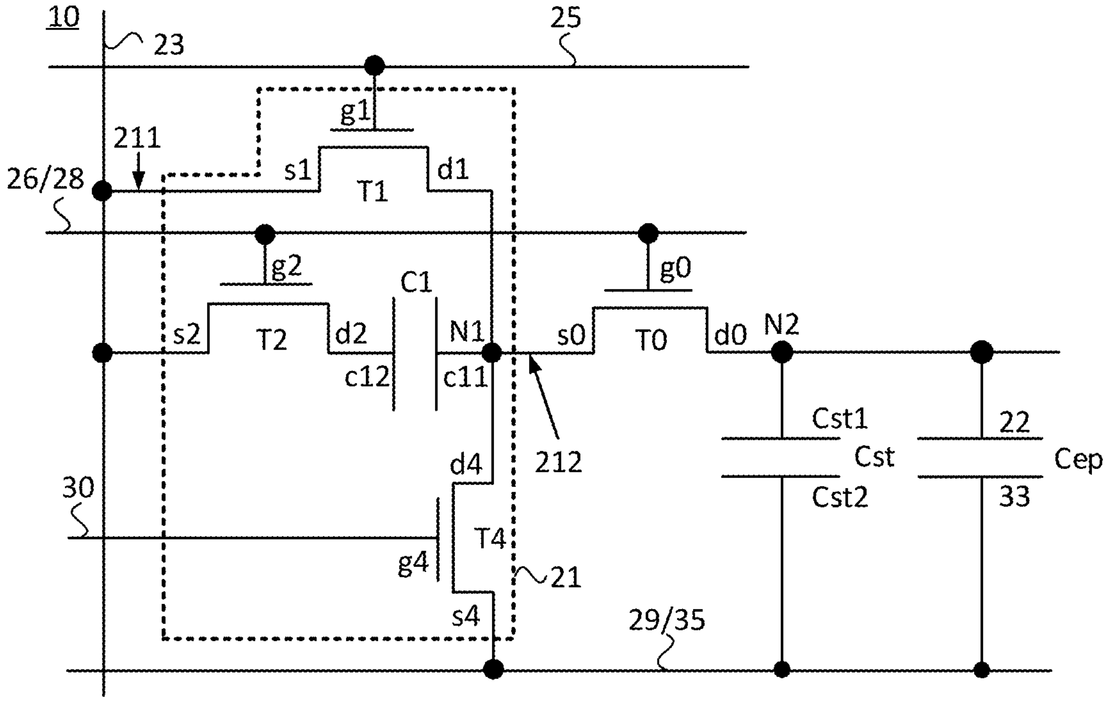
FIG. 19 is a structure diagram of another pixel circuit according to an embodiment of the present disclosure.

FIG. 16 is another structure diagram of a pixel circuit according to an embodiment of the present disclosure. FIG. 17 is a structure diagram of another pixel circuit according to an embodiment of the present disclosure. FIG. 18 is a structure diagram of another pixel circuit according to an embodiment of the present disclosure. FIG. 19 is a structure diagram of another pixel circuit according to an embodiment of the present disclosure. As shown in FIGS. 16 to 19, the boosting unit 21 further includes a reset transistor T4. A first electrode s4 of the reset transistor T4 is connected to a reset signal line 29. The reset signal line 29 is configured to receive a reset signal. A gate g4 of the reset transistor T4 is connected to a fourth scan signal line 30. The fourth scan signal line 30 is configured to receive a fourth scan signal. A second electrode d4 of the reset transistor T4 is electrically connected to the first electrode c11 of the bootstrap capacitor C1 or the second electrode c12 of the bootstrap capacitor C1.

The reset transistor T4 is used to clear or reset charges accumulated by the bootstrap capacitor C1 in the previous frame, thereby reducing an effect of the residual charges in the previous frame on a bootstrap voltage in the current frame, contributing to improving the accuracy and stability of the bootstrap voltage and further contributing to improving image display quality and reducing a display error.

As shown in FIGS. 16 to 19, the gate g4 of the reset transistor T4 is electrically connected to the fourth scan signal line 30 and receives the fourth scan signal provided by the fourth scan signal line 30. The fourth scan signal is used to enable the reset transistor T4 to turn on. If the reset transistor T4 is an n-type transistor, the fourth scan signal may be a high-level signal. If the reset transistor T4 is a p-type transistor, the fourth scan signal may be a low-level signal.

The first electrode s4 of the reset transistor T4 is electrically connected to the reset signal line 29 and receives the reset signal provided by the reset signal line 29. When the fourth scan signal enables the reset transistor T4 to turn on, the reset signal can be transmitted from the first electrode s4 of the reset transistor T4 to the second electrode d4 of the reset transistor T4.

Further, as shown in FIGS. 16 and 18, the second electrode d4 of the reset transistor T4 may be electrically connected to the second electrode c12 of the bootstrap capacitor C1. When the bootstrap capacitor C1 needs to be reset, the fourth scan signal line 30 provides the fourth scan signal to the gate g4 of the reset transistor T4, and the reset transistor T4 is turned on so that the reset signal on the reset signal line 29 is transmitted to the second electrode c12 of the bootstrap capacitor C1. In this manner, the residual charges on the bootstrap capacitor C1 from the previous frame are counteracted and cleared, thereby reducing the effect of the residual charges from the previous frame on the bootstrap voltage in the current frame and contributing to improving the accuracy and stability of the bootstrap voltage.

With continued reference to FIGS. 17 and 19, the second electrode d4 of the reset transistor T4 may be electrically connected to the first electrode c11 of the bootstrap capacitor C1. When the bootstrap capacitor C1 needs to be reset, the fourth scan signal line 30 provides the fourth scan signal to the gate g4 of the reset transistor T4, and the reset transistor T4 is turned on so that the reset signal on the reset signal line 29 is transmitted to the first electrode c11 of the bootstrap capacitor C1. In this manner, a residual voltage on the bootstrap capacitor C1 from the previous frame is counteracted and cleared, thereby reducing an effect of the residual voltage from the previous frame on the bootstrap voltage in the current frame and contributing to improving the accuracy and stability of the bootstrap voltage.

Figure 20:
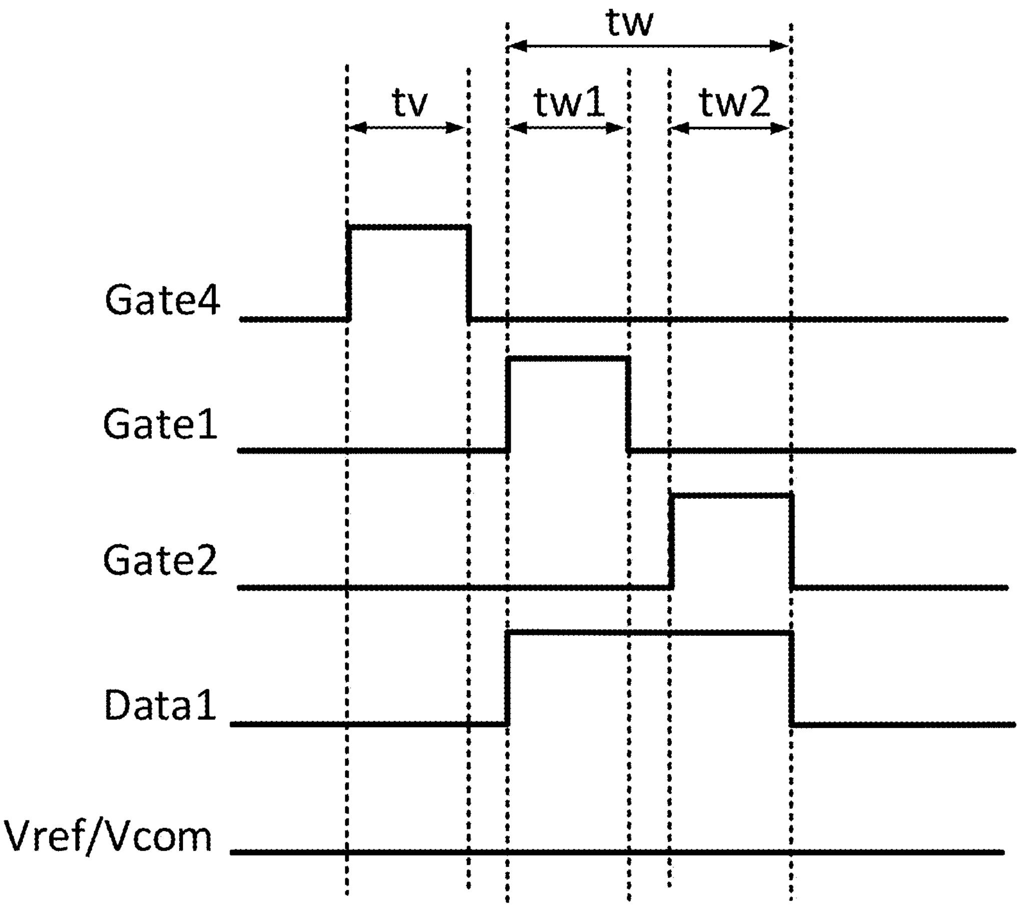
FIG. 20 is another drive timing diagram of a display panel according to an embodiment of the present disclosure.

FIG. 20 is another drive timing diagram of a display panel according to an embodiment of the present disclosure. As shown in FIGS. 16 to 20, a working period of the pixel circuit 10 includes a reset stage tv and a data write stage tw in sequence.

In the reset stage tv, the fourth scan signal line 30 provides the fourth scan signal Gate4 to the gate g4 of the reset transistor T4. The fourth scan signal Gate4 is an effective pulse for controlling the reset transistor T4 to turn on to write the reset signal into the first electrode c11 of the bootstrap capacitor C1 or the second electrode c12 of the bootstrap capacitor C1.

In the data write stage tw, the first data signal line 23 provides the first data signal Data1 to the first terminal 211 of the boosting unit 21.

As shown in FIGS. 16 to 20, when the pixel circuit 10 is working, the reset stage tv and the data write stage tw are performed in sequence.

In the reset stage tv, the fourth scan signal line 30 provides the fourth scan signal Gate4 to the gate g4 of the reset transistor T4. The fourth scan signal Gate4 provided by the fourth scan signal line 30 to the gate g4 of the reset transistor T4 is an effective pulse for controlling the reset transistor T4 to turn on. For example, when the reset transistor T4 is an n-type transistor, the fourth scan signal Gate4 may be a high-level pulse signal, and when the reset transistor T4 is a p-type transistor, the fourth scan signal Gate4 may be a low-level pulse signal. In FIG. 20, that the reset transistor T4 is an n-type transistor is used as an example for illustration, but is not limited thereto.

Further, the fourth scan signal Gate4 enables the reset transistor T4 to turn on. In this case, the reset transistor T4 conducts between the first electrode s4 of the reset transistor T4 and the second electrode d4 of the reset transistor T4 so that conduction between the reset signal line 29 and one of the first electrode c11 or the second electrode c12 of the bootstrap capacitor C1 is permitted and the reset signal Vref provided by the reset signal line 29 is applied to one of the first electrode c11 or the second electrode c12 of the bootstrap capacitor C1 to counteract or clear the residual charges on the bootstrap capacitor C1 from the previous frame.

In the data write stage tw, the first data signal line 23 provides the first data signal Data1 to the first terminal 211 of the boosting unit 21. For a working process of the data write stage tw, reference may be made to the preceding embodiments, which is not repeated here.

In the reset stage tv before the data write stage tw, the residual charges on the bootstrap capacitor C1 from the previous frame have been counteracted or cleared, thereby reducing the effect of the residual charges on the bootstrap capacitor C1 from the previous frame on the bootstrap voltage in the current frame and contributing to improving the accuracy and stability of the bootstrap voltage.

Further, the reset signal line 29 may be electrically connected to the common electrode layer 33. In this case, as shown in FIG. 20, a voltage of the reset signal Vref is equal to a common voltage Vcom on the common electrode layer 33. In this manner, a circuit structure can be simplified, and a hardware cost can be reduced.

With continued reference to FIGS. 4, 5, 12 and 16 to 19, the pixel circuit 10 further includes a storage capacitor Cst, a first electrode Cst1 of the storage capacitor Cst is electrically connected to the first electrode d0 of the drive transistor T0, and a second electrode Cst2 of the storage capacitor Cst is connected to a first power signal line 35. The first power signal line 35 is configured to receive a first power signal. A capacitance value of the bootstrap capacitor C1 is greater than or equal to a capacitance value of the storage capacitor Cst.

As shown in FIGS. 4, 5, 12 and 16 to 19, the storage capacitor Cst is electrically connected between the first electrode d0 of the drive transistor T0 and the first power signal line 35. The storage capacitor Cst can store charges so that when power supply is not connected, the storage capacitor Cst can supply power to the pixel capacitor Cep, thereby maintaining continuous display of a display frame.

Setting a larger capacitance value for the bootstrap capacitor C1 (for example, the capacitance value of the bootstrap capacitor C1 is greater than or equal to the capacitance value of the storage capacitor Cst) facilitates the improvement of the bootstrap effect of the bootstrap capacitor C1 and the improvement of the accuracy and stability of the bootstrap voltage, thereby improving the image display quality and reducing the display error.

Moreover, setting a smaller capacitance value for the storage capacitor Cst can reduce a size of the storage capacitor Cst, thereby improving integration of the display panel and improving a pixel density.

It is to be noted that specific capacitance values of the bootstrap capacitor C1 and the storage capacitor Cst may be set according to actual requirements and are not limited in the embodiments of the present disclosure.

In addition, as shown in FIGS. 4, 5, 12 and 16 to 19, the first power signal is transmitted on the first power signal line 35. The first power signal is a constant voltage signal. The first power signal line 35 may be electrically connected to the common electrode layer 33. In this case, the voltage of the first power signal is equal to a common voltage Vcom on the common electrode layer 33. In this manner, a circuit structure can be simplified, and hardware cost can be reduced.

Both the first transistor T1 and the second transistor T2 are metal oxide thin-film transistors, and/or both the first transistor T1 and the second transistor T2 are double-gate transistors.

A metal oxide (indium gallium zinc oxide, IGZO) thin-film transistor has a relatively small leakage current in an off state. Therefore, the first transistor T1 and the second transistor T2 are IGZO transistors. When the first transistor T1 and the second transistor T2 are turned off, an ideal voltage level can be more accurately maintained at the first node N1, thereby ensuring that the drive transistor T0 can be accurately turned on or off and improving display quality.

In addition, a double-gate structure of the double-gate transistor can enhance the control of a working state of the transistor and further reduce a leakage current. Therefore, the first transistor T1 and the second transistor T2 are double-gate transistors. When the first transistor T1 and the second transistor T2 are turned off, the ideal voltage level can also be more accurately maintained at the first node N1, thereby ensuring that the drive transistor T0 can be accurately turned on or off and improving the display quality.

With continued reference to FIG. 3, the display panel provided in the embodiment of the present disclosure includes a first substrate 41, and the drive transistor T0 includes a first active layer T01, a first source and drain layer T02 and a first gate T03 that are stacked, the first gate T03 is located on a side of the first active layer T01 facing the first substrate 41. One of the first electrode c11 or the second electrode c12 of the bootstrap capacitor C1 is located in the same film as the first source and drain layer T02, and the other one is located in the same film as the first gate T03.

As shown in FIG. 3, the drive transistor T0 has a bottom-gate (back-channel-etched, BCE) structure. The first gate T03 of the drive transistor T0 is located on the side of the first active layer T01 facing the first substrate 41 so that the first gate T03 of the drive transistor T0 can play a role in shielding light for the first active layer T01, thereby reducing an effect of illumination on the threshold voltage of the drive transistor T0, enhancing the photoelectric stability of the drive transistor T0, reducing threshold voltage drift phenomena and contributing to improving display quality and long-term stability.

Further, as shown in FIG. 3, one of the first electrode c11 or the second electrode c12 of the bootstrap capacitor C1 may be disposed in the same layer as the first source and drain layer T02. In this manner, one metal layer can be reduced, thereby achieving an object of reducing a production cost and reducing a thickness of the panel. Moreover, one of the first electrode c11 or the second electrode c12 of the bootstrap capacitor C1 may be further made of the same material as the first source and drain layer T02 so that one of the first electrode c11 or the second electrode c12 of the bootstrap capacitor C1 and the first source and drain layer T02 can be prepared in the same preparation process, thereby shortening the time of the preparation process.

Similarly, one of the first electrode c11 or the second electrode c12 of the bootstrap capacitor C1 may also be disposed in the same layer as the first gate T03. In this manner, one metal layer can be reduced, thereby achieving the object of reducing the production cost and reducing the thickness of the panel. Moreover, one of the first electrode c11 or the second electrode c12 of the bootstrap capacitor C1 may be further made of the same material as the first gate T03 so that one of the first electrode c11 or the second electrode c12 of the bootstrap capacitor C1 and the first gate T03 can be prepared in the same preparation process, thereby shortening the time of the preparation process.

It is to be noted that in FIG. 3, the first electrode c11 of the bootstrap capacitor C1 located in the same film as the first gate T03 and the second electrode c12 of the bootstrap capacitor C1 located in the same film as the first source and drain layer T02 only are used as an example for illustration, but is not limited thereto.

Figure 21:
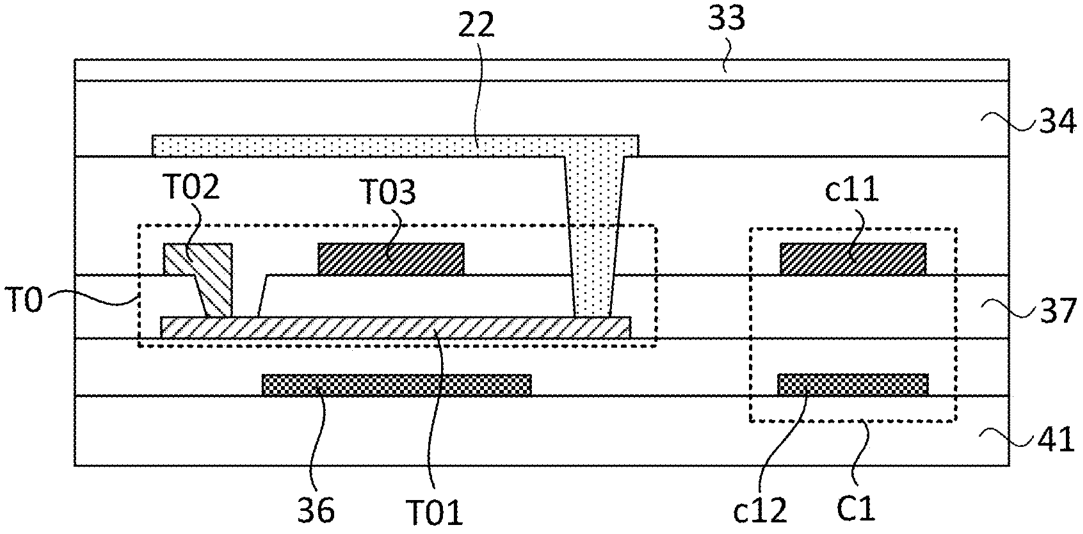
FIG. 21 is a partial sectional view of a display panel according to an embodiment of the present disclosure.

FIG. 21 is a partial sectional view of a display panel according to an embodiment of the present disclosure. As shown in FIG. 21, the display panel provided in the embodiment of the present disclosure includes a first substrate 41 and a light-shielding layer 36, and the drive transistor T0 includes a first active layer T01, a first source and drain layer T02 and a first gate T03 that are stacked, the first gate T03 is located on a side of the first active layer T01 facing away from the first substrate 41. The light-shielding layer 36 is located on a side of the first active layer T01 facing the first substrate 41 and at least partially overlaps the first active layer in a thickness direction along the first substrate 41. One of the first electrode c11 or the second electrode c12 of the bootstrap capacitor C1 is located in the same film layer as the first gate T03, and the other one is located in the same film layer as the light-shielding layer 36.

As shown in FIG. 21, the drive transistor T0 has a top-gate structure. The first gate T03 of the drive transistor T0 is located on the side of the first active layer T01 facing away from the first substrate 41. When a gate insulating layer 37 is prepared on a side between the first active layer T01 and the first gate T03, a chemical reaction can be performed through chemical vapor deposition to form a film to form the gate insulating layer 37. The film formation manner has relatively few defects formed between the gate insulating layer 37 and the first active layer T01. Therefore, when the drive transistor T0 is working, electron capture phenomena on the interface between the gate insulating layer 37 and the first active layer T01 can be reduced. As a voltage is applied to the first gate T03 over time, electrons captured on the interface between the gate insulating layer 37 and the first active layer T01 are reduced so that the threshold voltage drift phenomena of the drive transistor T0 can be alleviated, improving the stability of the drive transistor T0.

Further, as shown in FIG. 21, the light-shielding layer 36 is located on the side of the first active layer T01 facing the first substrate 41 and at least partially overlaps the first active layer T01 in the thickness direction along the first substrate 41 so that the light-shielding layer 36 can play a role in shielding light for the first active layer T01, thereby reducing an effect of illumination on the threshold voltage of the drive transistor T0, enhancing the photoelectric stability of the drive transistor T0, reducing the threshold voltage drift phenomena and contributing to the improvement on the display quality and long-term stability.

Further, as shown in FIG. 21, one of the first electrode c11 or the second electrode c12 of the bootstrap capacitor C1 may be disposed in the same layer as the first gate T03. In this manner, one metal layer can be reduced, thereby achieving a decrease in the production cost and a decrease in the thickness of the panel. Moreover, one of the first electrode c11 or the second electrode c12 of the bootstrap capacitor C1 may be further made of the same material as the first gate T03 so that one of the first electrode c11 or the second electrode c12 of the bootstrap capacitor C1 and the first gate T03 can be prepared in the same preparation process, thereby shortening the time of the preparation process.

Similarly, one of the first electrode c11 or the second electrode c12 of the bootstrap capacitor C1 may also be disposed in the same layer as the light-shielding layer 36. In this manner, one metal layer can be reduced, thereby achieving the object of reducing the production cost and reducing the thickness of the panel. Moreover, one of the first electrode c11 or the second electrode c12 of the bootstrap capacitor C1 may be further made of the same material as the light-shielding layer 36 so that one of the first electrode c11 or the second electrode c12 of the bootstrap capacitor C1 and the light-shielding layer 36 can be prepared in the same preparation process, thereby shortening the time of the preparation process.

In FIG. 21, the first electrode c11 of the bootstrap capacitor C1 located in the same film layer as the first gate T03 and the second electrode c12 of the bootstrap capacitor C1 located in the same film layer as the light-shielding layer 36 are only used as an example for illustration, but is not limited thereto.

Further, the first transistor T1 and the second transistor T2 may have the same structure as the drive transistor T0, for example, the BCE structure or top-gate structure, so that the first transistor T1 and the second transistor T2 can be prepared with the drive transistor T0 in the same preparation process to improve the production efficiency and reduce the process complexity and preparation cost.

For example, each of the first transistor T1, the second transistor T2 and the drive transistor T0 may have a top-gate structure. The drive transistor T0 has the top-gate structure, thereby implementing a higher on-current. When the drive transistor T0 is turned on, the higher on-current helps the data signal to be quickly and fully written into the pixel electrode, thereby shortening the charging time of a pixel and facilitating the improvement of the image refresh rate of the display panel.

Moreover, the first transistor T1 and the second transistor T2 have the top-gate structure so that the gates of the first transistor T1 and the second transistor T2 have strong control forces over charges in channel regions of the first transistor T1 and the second transistor T2, thereby more effectively controlling the on state and the off state of the first transistor T1 and the second transistor T2. Meanwhile, a generally small parasitic capacitance of the top-gate structure helps an improvement on a switch speed of the first transistor T1 and the second transistor T2, to reduce a delay and improve the response time and refresh rate of the display panel.

Figure 22:
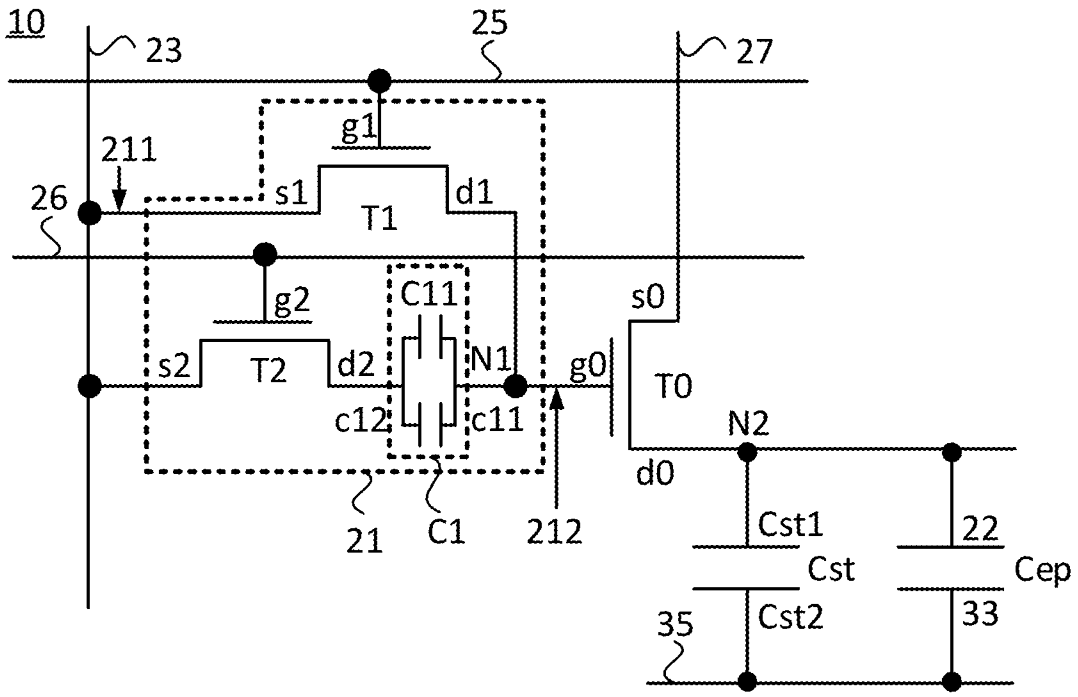
FIG. 22 is a structure diagram of another pixel circuit according to an embodiment of the present disclosure.
Figure 23:
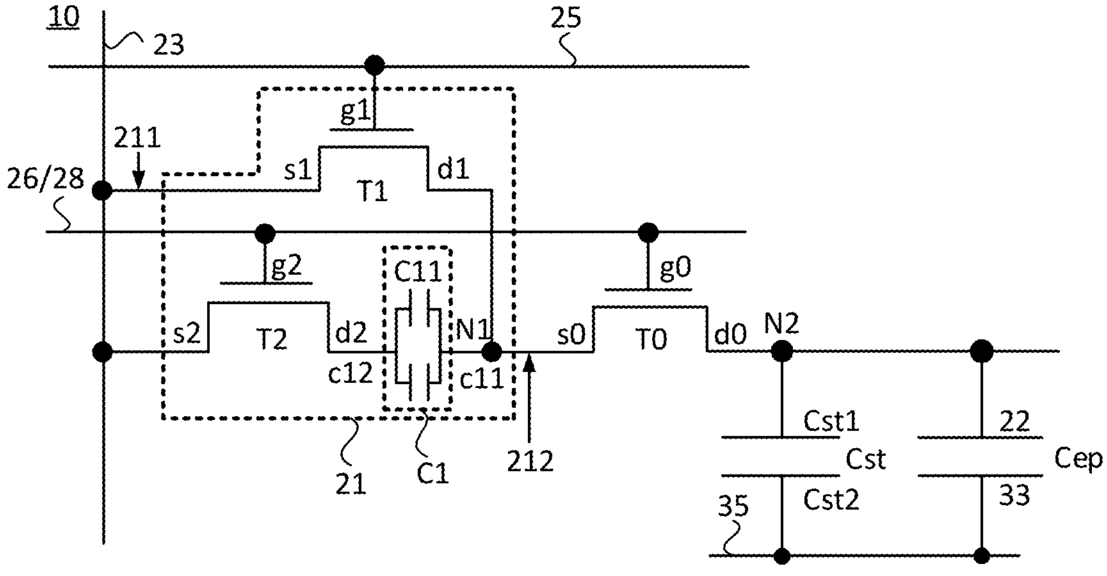
FIG. 23 is a structure diagram of another pixel circuit according to an embodiment of the present disclosure.

FIG. 22 is a structure diagram of another pixel circuit according to an embodiment of the present disclosure. FIG. 23 is a structure diagram of another pixel circuit according to an embodiment of the present disclosure. As shown in FIGS. 22 and 23, the bootstrap capacitor C1 includes a plurality of sub-capacitors C11, and the plurality of sub-capacitors C11 are connected in parallel.

As shown in FIGS. 22 and 23, the form of the plurality of sub-capacitors C11 connected in parallel is used in the bootstrap capacitor C1 so that the plurality of sub-capacitors C11 may be distributed in different films. The plurality of sub-capacitors C11 are overlapped, thereby saving a plane space of the display panel, contributing to improving the pixel density and implementing a higher resolution.

The form of the plurality of sub-capacitors C11 connected in parallel is used in the bootstrap capacitor C1 so that while the requirement for the capacitance value of the bootstrap capacitor C1 is met, a single sub-capacitor C11 may have a small capacitance value. For example, the capacitance value of the sub-capacitor C11 may be less than or equal to the capacitance value of the storage capacitor Cst to reduce the size of the sub-capacitor C11, thereby contributing to further improving the integration of the display panel and improving the pixel density.

It is to be noted that in the pixel circuits shown in FIGS. 22 and 23, the case where the bootstrap capacitor C1 includes two sub-capacitors C11 connected in parallel only is used as an example for illustration. In another embodiment, the number of sub-capacitors C11 in the bootstrap capacitor C1 may also be three, four or more and is not limited in the embodiments of the present disclosure.

A channel width-to-length ratio of the drive transistor T0 is greater than a channel width-to-length ratio of the first transistor T1, and/or a channel width-to-length ratio of the drive transistor T0 is greater than a channel width-to-length ratio of the second transistor T2.

A channel width-to-length ratio refers to a ratio of the width to the length of a channel of a transistor. The larger the channel width-to-length ratio, the larger the conductive area of the transistor, the larger the conduction area, and the larger the current allowed to flow through the transistor within the per unit time.

In the present embodiment, the channel width-to-length ratio of the drive transistor T0 is set to be larger so that the drive transistor T0 can provide a larger on-current, thereby improving the write speed of the data signal of the pixel electrode and contributing to achieving a display effect of a higher frame rate.

Further, when the first transistor T1 and the second transistor T2 are working, switching between the on state and the off state is generally performed instead of continuous transmission with a large current. Therefore, on the premise of ensuring that the first transistor T1 and the second transistor T2 have enough switch performance, the channel width-to-length ratio of the first transistor T1 and/or the channel width-to-length ratio of the second transistor T2 can be appropriately reduced, that is, the first transistor T1 and/or the second transistor T2 has a smaller channel width-to-length ratio. In this manner, an area occupied by the first transistor T1 and/or an area occupied by the second transistor T2 can be reduced, thereby facilitating the improvement of the pixel density of the display panel and the implementation of a higher resolution.

Figure 24:
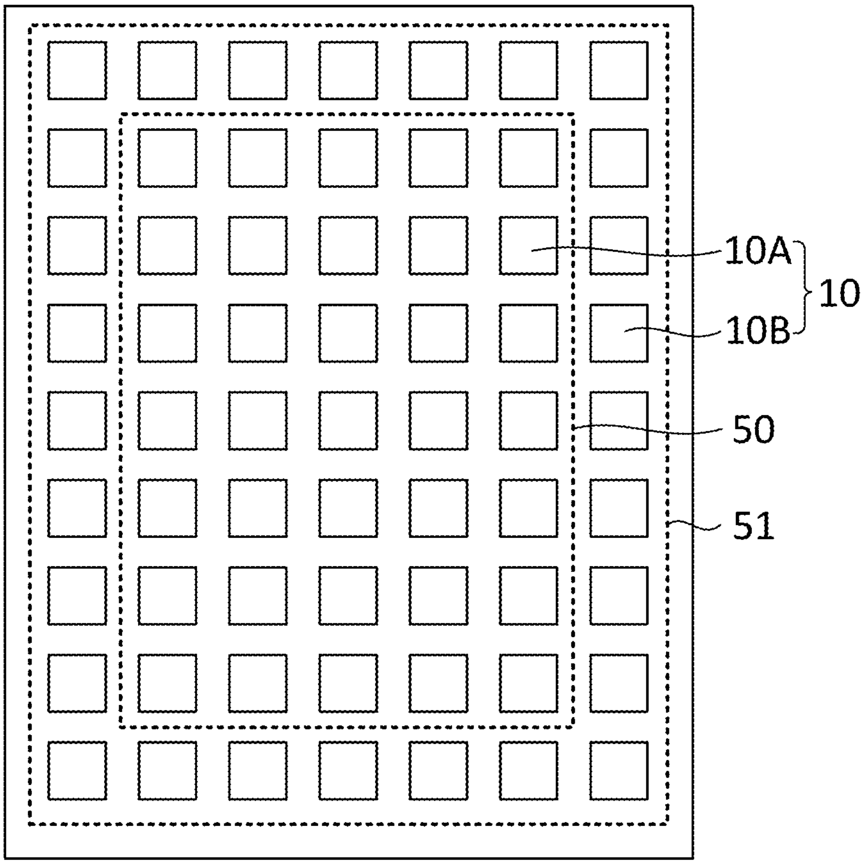
FIG. 24 is a structure diagram of another display panel according to an embodiment of the present disclosure.

FIG. 24 is a structure diagram of another display panel according to an embodiment of the present disclosure. As shown in FIGS. 4, 5 and 24, the display panel provided in the embodiment of the present disclosure includes a central display region 50 and an edge display region 51 sounding the central display region 50. A pixel circuit 10 located in the central display region 50 is a first pixel circuit 10A, and a pixel circuit 10 located in the edge display region 51 is a second pixel circuit 10B. A capacitance value of a bootstrap capacitor C1 in the first pixel circuit 10A is less than a capacitance value of a bootstrap capacitor C1 in the second pixel circuit 10B.

As shown in FIG. 24, a large overlap exists between the circuit structure in the edge display region 51 and a bezel region of the display panel so that capacitive coupling more easily occurs between the second pixel circuit 10B located in the edge display region 51 and the circuit structure in the bezel region of the display panel. The capacitive coupling may cause more interferences formed between the second pixel circuit 10B in the edge display region 51 and the circuit structure in the bezel region, thereby affecting the normal working of the second pixel circuit 10B. Moreover, for the display panel of an electronic paper, the electrophoretic display layer in the edge display region 51 is more easily maldistributed to cause a difference in the display effect between the edge display region 51 and the central display region 50.

In the present embodiment, as shown in FIGS. 4, 5 and 24, the first pixel circuit 10A located in the central display region 50 is less affected by the circuit structure in the bezel region. The capacitance value of the bootstrap capacitor C1 in the first pixel circuit 10A is set to be smaller so that while requirements for display and driving of the central display region 50 are met, an occupied area of the bootstrap capacitor C1 can be reduced, thereby contributing to saving the space and cost.

Moreover, the second pixel circuit 10B located in the edge display region 51 is greatly affected by the circuit structure in the bezel region. The capacitance value of the bootstrap capacitor C1 in the second pixel circuit 10B is set to be larger, thereby improving the bootstrap effect of the bootstrap capacitor C1 in the second pixel circuit 10B, improving the stability of a bootstrap voltage, facilitating in solving the interference suffered by the second pixel circuit 10B and the improvement on a drive capability of the second pixel circuit 10B, effectively reducing the difference between the display effect of the central display region 50 and the display effect of the edge display region 51 and improving the display uniformity of an image.

Areas and ranges of the central display region 50 and the edge display region 51 may be set according to actual requirements and are not limited in the embodiments of the present disclosure.

With continued reference to FIGS. 4, 5 and 24, the display panel provided in the embodiment of the present disclosure includes a central display region 50 and an edge display region 51 disposed around the central display region 50. A pixel circuit 10 located in the central display region 50 is a first pixel circuit 10A, and a pixel circuit 10 located in the edge display region 51 is a second pixel circuit 10B. A channel width-to-length ratio of a first transistor T1 in the first pixel circuit 10A is less than a channel width-to-length ratio of a first transistor T1 in the second pixel circuit 10B, and/or a channel width-to-length ratio of a second transistor T2 in the first pixel circuit 10A is less than a channel width-to-length ratio of a second transistor T2 in the second pixel circuit 10B.

As described above, the first pixel circuit 10A located in the central display region 50 is less affected by the circuit structure in the bezel region. In the present embodiment, the first transistor T1 and/or the second transistor T2 in the first pixel circuit 10A has a smaller channel width-to-length ratio so that while the requirements for display and driving of the central display region 50 is met, an area occupied by the first transistor T1 and/or an area occupied by the second transistor T2 can be reduced, thereby contributing to improving the pixel density of the display panel and implementing a higher resolution.

Moreover, the second pixel circuit 10B located in the edge display region 51 is greatly affected by the circuit structure in the bezel region. In the present embodiment, the first transistor T1 and/or the second transistor T2 in the second pixel circuit 10B has a larger channel width-to-length ratio, thereby improving the switch performance of the first transistor T1 and/or the second transistor T2, facilitating enhancement of an interference rejection capability and driving strength of the second pixel circuit 10B, facilitating in solving the interference suffered by the second pixel circuit 10B, effectively reducing the difference between the display effect of the central display region 50 and the display effect of the edge display region 51 and improving the display uniformity of the image.

With continued reference to FIGS. 4, 5 and 24, the display panel provided in the embodiment of the present disclosure includes a central display region 50 and an edge display region 51 surrounding the central display region 50. A pixel circuit 10 located in the central display region 50 is a first pixel circuit 10A, and a pixel circuit 10 located in the edge display region 51 is a second pixel circuit 10B. A channel width-to-length ratio of a drive transistor T0 in the first pixel circuit 10A is less than a channel width-to-length ratio of a drive transistor T0 in the second pixel circuit 10B.

As described above, the first pixel circuit 10A located in the central display region 50 is less affected by the circuit structure in the bezel region. In the present embodiment, the drive transistor T0 in the first pixel circuit 10A has a smaller channel width-to-length ratio so that while the requirements for display and driving of the central display region 50 is met, an area occupied by the drive transistor T0 can be reduced, thereby contributing to improving the pixel density of the display panel and implementing a higher resolution.

Moreover, the second pixel circuit 10B located in the edge display region 51 is greatly affected by the circuit structure in the bezel region. In the present embodiment, the drive transistor T0 in the second pixel circuit 10B has a larger channel width-to-length ratio so that the drive transistor T0 can provide a larger on-current, thereby facilitating an improvement of the drive capability of the second pixel circuit 10B, helping to solve the interference suffered by the second pixel circuit 10B, effectively reducing the difference of the display effect between the central display region 50 and the edge display region 51 and improving the display uniformity of the image.

Figure 25:
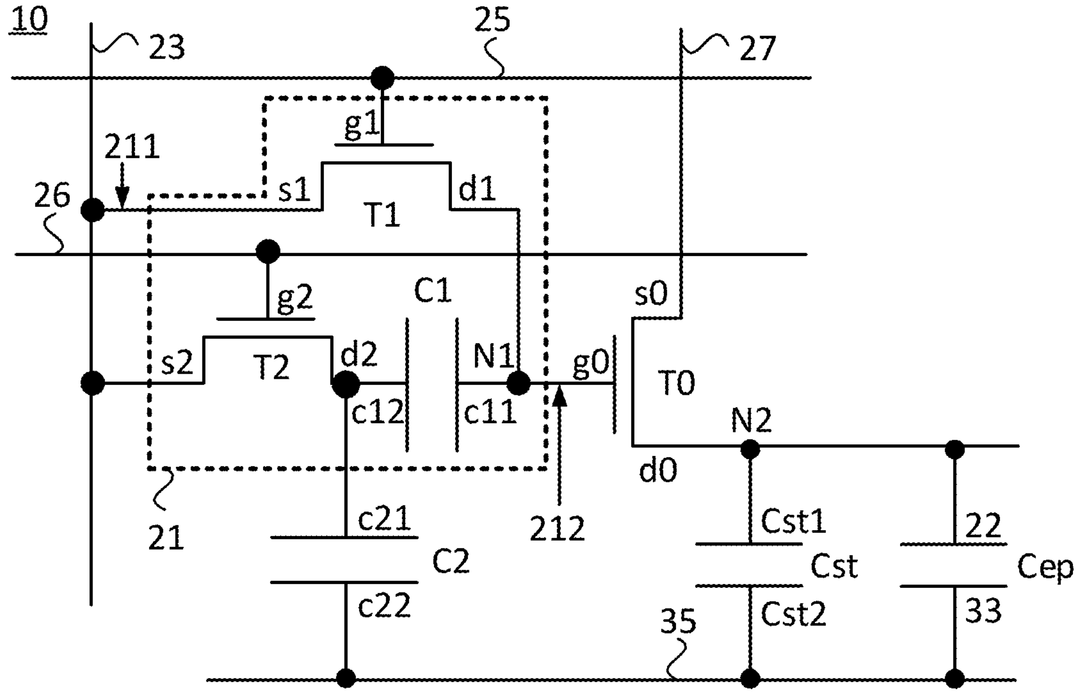
FIG. 25 is a structure diagram of another pixel circuit according to an embodiment of the present disclosure.
Figure 26:
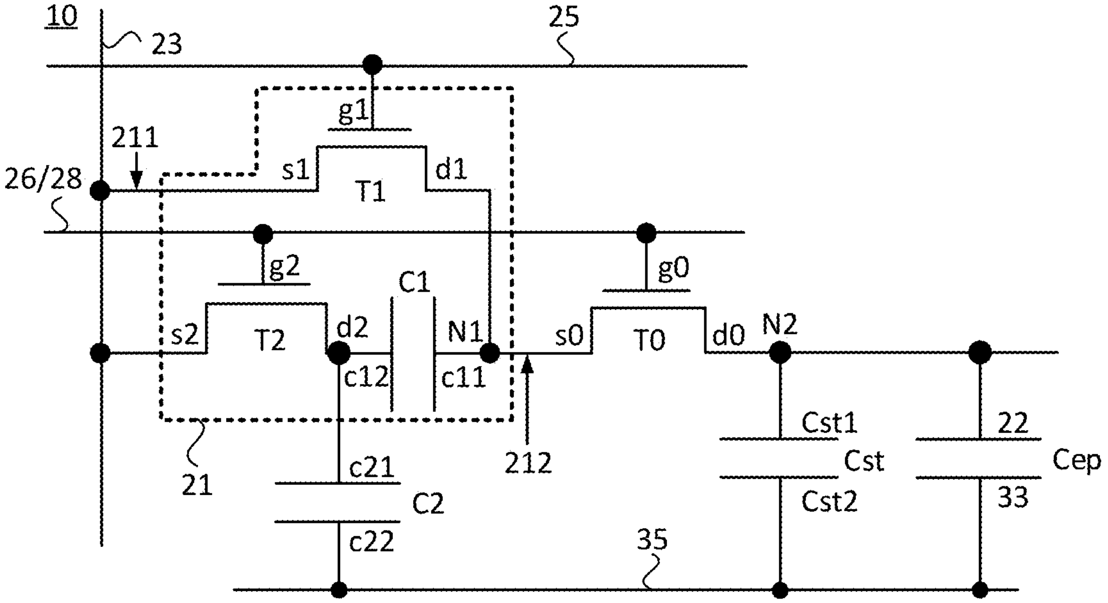
FIG. 26 is a structure diagram of another pixel circuit according to an embodiment of the present disclosure.

FIG. 25 is a structure diagram of another pixel circuit according to an embodiment of the present disclosure. FIG. 26 is a structure diagram of another pixel circuit according to an embodiment of the present disclosure. As shown in FIGS. 25 and 26, the pixel circuit 10 further includes an auxiliary capacitor C2, a first electrode c21 of the auxiliary capacitor C2 is connected to the first electrode d2 of the second transistor T2, and a second electrode c22 of the auxiliary capacitor C2 is connected to a first power signal line 35. The first power signal line 35 is configured to receive a first power signal.

As shown in FIGS. 25 and 26, a capacitance on a side of the second electrode c12 of the bootstrap capacitor C1 affects the bootstrap effect of the bootstrap voltage output from the bootstrap capacitor C1. The larger the capacitance on the side of the second electrode c12 of the bootstrap capacitor C1, the better the bootstrap effect of the bootstrap capacitor C1.

In the present embodiment, as shown in FIGS. 25 and 26, the auxiliary capacitor C2 is added to the pixel circuit 10 and electrically connected between the first electrode d2 of the second transistor T2 and the first power signal line 35. The first power signal line 35 is used for receiving the first power signal. The first power signal is a constant voltage signal. The auxiliary capacitor C2 is electrically connected to the second electrode c12 of the bootstrap capacitor C1, that is, a capacitor is further electrically connected to the side of the second electrode c12 of the bootstrap capacitor C1. When the second transistor T2 is turned on, the auxiliary capacitor C2 is connected to the bootstrap capacitor C1 in parallel, which is equivalent to an increase in an equivalent capacitance value on the side of the second electrode c12 of the bootstrap capacitor C1, thereby improving charging and discharging capability of the bootstrap capacitor C1, contributing to ensuring the bootstrap effect of the bootstrap voltage output from the first electrode c11 of the bootstrap capacitor C1 and improving the accuracy and stability of the potential of the first node N1.

A capacitance value of the auxiliary capacitor C2 may be set according to an actual requirement and is not limited in the embodiment of the present disclosure.

Figure 27:
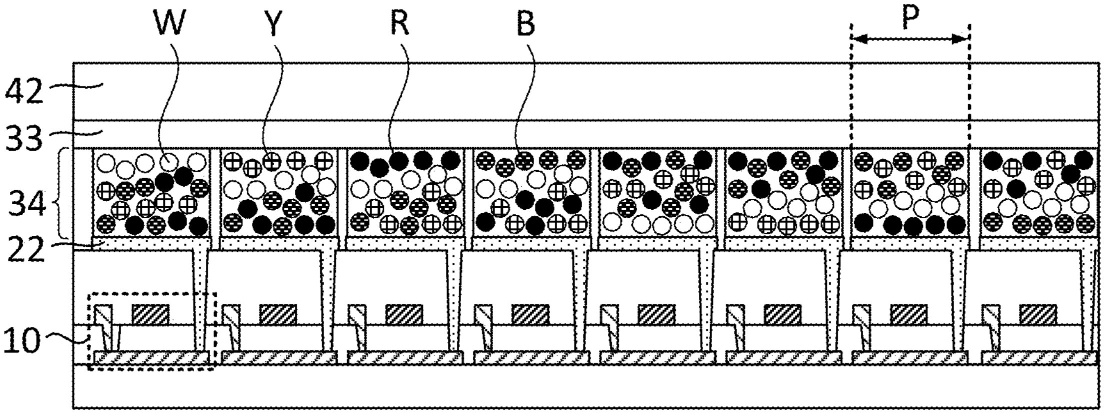
FIG. 27 is a partial sectional view of another display panel according to an embodiment of the present disclosure.

FIG. 27 is a partial sectional view of another display panel according to an embodiment of the present disclosure. As shown in FIG. 27, the display panel provided in the embodiment of the present disclosure further includes a first substrate 41, a second substrate 42 and an electrophoretic display layer 34 and a common electrode layer 33 that are located between the first substrate 41 and the second substrate 42, the electrophoretic display layer 34 is located on a side of the pixel electrode 22 facing away from the first substrate 41, and the common electrode layer 33 is located on a side of the electrophoretic display layer 34 facing away from the pixel electrode 22.

The display panel provided in the embodiment of the present disclosure is a display panel of an electronic paper.

As shown in FIG. 27, the electrophoretic display layer 34 may include electrophoretic particles of at least two colors. In FIG. 27, that the electrophoretic display layer 34 includes a white electrophoretic particle W, a red electrophoretic particle R, a yellow electrophoretic particle Y and a blue electrophoretic particle B is used as an example for illustration, but is not limited thereto.

In another embodiment, the electrophoretic display layer 34 may include at least two types of the white electrophoretic particle W, the red electrophoretic particle R, the yellow electrophoretic particle Y and the blue electrophoretic particle B, which is not limited in the embodiments of the present disclosure.

The common electrode layer 33 is disposed between the second substrate 42 and the electrophoretic display layer 34 and used for transmitting the common voltage Vcom. The common voltage Vcom is a constant voltage.

The pixel electrodes 22 are disposed between the first substrate 41 and the electrophoretic display layer 34. A plurality of pixel regions P are disposed in the display panel. Each pixel region P corresponds to a respective pixel electrode 22. The pixel electrodes 22 are electrically connected to a plurality of pixel circuits 10 correspondingly.

The common electrode layer 33 receives the common voltage Vcom, and the pixel electrode 22 receives the data signal. The electric field can be formed between the pixel electrode 22 and the common electrode layer 33. The electric field generates the attraction force or the repulsive force to the electrophoretic particles so that the electrophoretic particles move under the action of the electric field.

Further, electrophoretic particles of different colors carry different charges. When a particular voltage signal is applied to the pixel electrode 22, electrophoretic particles carrying corresponding charges may move in the direction facing or facing away from the pixel electrode 22. Therefore, different data signals are written into the pixel electrode 22 by the pixel circuit 10 so that positions of electrophoretic particles of different colors in the electrophoretic display layer 34 can be accurately controlled and electrophoretic particles of a plurality of colors simultaneously or partially appear on the surface of the electrophoretic display layer 34, thereby forming the color mixing and displaying the colored display effect.

For example, a charge property of the blue electrophoretic particle B is the same as a charge property of the red electrophoretic particle R but a threshold voltage of the blue electrophoretic particle B is less than a threshold voltage of the red electrophoretic particle R. When a voltage difference between the pixel electrode 22 and the common electrode layer 33 is greater than the threshold voltage of the blue electrophoretic particle B and less than the threshold voltage of the red electrophoretic particle R, the blue electrophoretic particle B moves, and the red electrophoretic particle R does not move. When the voltage difference between the pixel electrode 22 and the common electrode layer 33 is greater than the threshold voltage of the red electrophoretic particle R, both the blue electrophoretic particle B and the red electrophoretic particle R move. In this manner, different data signals are written into the pixel electrode 22 by the pixel circuit 10 so that positions of the blue electrophoretic particle B and the red electrophoretic particle R in the electrophoretic display layer 34 can be accurately controlled and at least one of the blue electrophoretic particle B and the red electrophoretic particle R appear on the surface of the electrophoretic display layer 34, thereby achieving a blue, red or purple display effect.

As shown in FIG. 27, that the electrophoretic display layer 34 includes the white electrophoretic particle W, the red electrophoretic particle R, the yellow electrophoretic particle Y and the blue electrophoretic particle B is used as an example for description. Eight different data signals may be written into the pixel electrode 22 by the pixel circuit 10, thereby implementing eight types of different color display, but is not limited thereto.

Based on the same inventive concept, embodiments of the present disclosure further provide a method for driving a display panel used for driving any display panel provided in the preceding embodiments. Structures and explanations of terms which are the same as or correspond to the structures and explanations of terms of the preceding embodiments are not repeated here.

Figure 28:
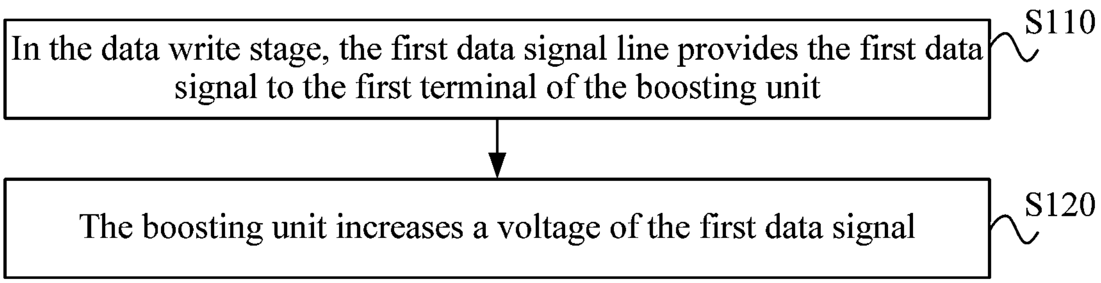
FIG. 28 is a flowchart of a method for driving a display panel according to an embodiment of the present disclosure.

FIG. 28 is a flowchart of a method for driving a display panel according to an embodiment of the present disclosure. As shown in FIG. 28, the driving method includes the steps described below.

In S110, in the data write stage, the first data signal line provides the first data signal to the first terminal of the boosting unit.

In S120, the boosting unit increases a voltage of the first data signal.

A working period of the pixel circuit includes the data write stage. In the data write stage, the first data signal line provides the first data signal to the first terminal of the boosting unit. The boosting unit increases a voltage value of the first data signal through the internal boosting mechanism. Subsequently, the boosted first data signal is output from the second terminal of the boosting unit. It is to be understood that the voltage output from the second terminal of the boosting unit is greater than the voltage of the first data signal provided by the first data signal line.

Further, the second terminal of the boosting unit is electrically connected to the gate or the second electrode of the drive transistor so that the boosted first data signal is output to the gate or the second electrode of the drive transistor and the transmission of the first data signal with a lower voltage by the first data signal line can implement the loading of a higher voltage at the gate or the second electrode of the drive transistor. In this manner, while the requirement for a larger voltage interval at the gate or the second electrode of the drive transistor is met, the voltage value of the first data signal transmitted on the first data signal line is reduced, thereby effectively reducing the IR drop of the first data signal line and reducing the overall power consumption.

The boosting unit includes a first switch transistor, a second switch transistor and a bootstrap capacitor or includes a first transistor, a second transistor and a bootstrap capacitor. A gate of the first transistor is connected to a first scan signal line, the first scan signal line receives a first scan signal, and a first electrode of the first transistor is connected to a first electrode of the bootstrap capacitor. A gate of the second transistor is connected to a second scan signal line, the second scan signal line receives a second scan signal, a first electrode of the second transistor is connected to a second electrode of the bootstrap capacitor, and a second electrode of the second transistor is connected to a second electrode of the first transistor. The second electrode of the first transistor is used as the first terminal of the boosting unit, and the first electrode of the first transistor is used as the second terminal of the boosting unit.

The data write stage includes a first sub-stage and a second sub-stage in sequence.

The step of increasing the voltage of the first data signal through the boosting unit includes the following.

In the first sub-stage, the first scan signal line provides the first scan signal to the gate of the first transistor. The first scan signal is an effective pulse for controlling the first transistor to turn on.

In the second sub-stage, the second scan signal line provides the second scan signal to the gate of the second transistor. The second scan signal is an effective pulse for controlling the second transistor to turn on.

In the first sub-stage, the first scan signal line provides the first scan signal to the gate of the first transistor. In this case, the first transistor is turned on, the second transistor is turned off, and the first transistor conducts between the second electrode of the first transistor and the first electrode of the first transistor so that conduction between the first data signal line and the first electrode of the bootstrap capacitor is permitted through the first transistor, the first data signal provided by the first data signal line is applied to the first electrode of the bootstrap capacitor and a voltage at the first electrode of the bootstrap capacitor rises to the voltage of the first data signal.

In the second sub-stage, the second transistor is turned on at this time, the first transistor is turned off, and the second transistor conducts between the second electrode of the second transistor and the first electrode of the second transistor so that conduction between the first data signal line and the second electrode of the bootstrap capacitor is permitted through the second transistor, the first data signal provided by the first data signal line is applied to the second electrode of the bootstrap capacitor and a voltage at the second electrode of the bootstrap capacitor rises to the voltage of the first data signal. Since a voltage difference between the first electrode and the second electrode of the bootstrap capacitor does not vary suddenly, a coupling variation occurs at the first electrode of the bootstrap capacitor due to a voltage variation of the second electrode of the bootstrap capacitor so that a bootstrap voltage higher than the voltage of the first data signal is generated at the first electrode of the bootstrap capacitor, thereby implementing the boosting function of the boosting unit.

A voltage value of the generated bootstrap voltage is related to the voltage value of the first data signal. For example, if the voltage value of the bootstrap voltage is two times the voltage value of the first data signal, the voltage value output from the second terminal of the boosting unit is two times the voltage value of the first data signal.

Further, the second terminal of the boosting unit is electrically connected to the gate or the second electrode of the drive transistor so that the bootstrap voltage is output to the gate or the second electrode of the drive transistor and the transmission of the first data signal with a lower voltage by the first data signal line can implement the loading of a higher voltage at the gate or the second electrode of the drive transistor. In this manner, while the requirement for a larger voltage interval at the gate or the second electrode of the drive transistor is met, the voltage value of the first data signal transmitted on the first data signal line is reduced, thereby effectively reducing the IR drop of the first data signal line and reducing the overall power consumption.

In the same data write stage, interval time between an end moment of the first scan signal and a start moment of the second scan signal is greater than 0.

As shown in FIG. 14, the effective pulse being a high-level pulse signal is used as an example for description. The end moment of the first scan signal Gate1 is a moment where the falling edge of the first scan signal Gate1 is located. The start moment of the second scan signal Gate2 is a moment where the rising edge of the second scan signal Gate2 is located.

It is to be understood that if the effective pulse is a low-level pulse signal, the end moment of the first scan signal Gate1 is a moment where the rising edge of the first scan signal Gate1 is located and the start moment of the second scan signal Gate2 is a moment where the falling edge of the second scan signal Gate2 is located.

In an actual situation, the first scan signal Gate1 and the second scan signal Gate2 may not be ideal square wave signals, and certain transition time (edge delays) may exist on the rising edges and the falling edges of the first scan signal Gate1 and the second scan signal Gate2. Moreover, the transistors are also not instantaneously turned on or off, and certain switch delays exist. Therefore, as shown in FIG. 14, in the same data write stage tw, setting the time interval al between the end moment of the first scan signal Gate1 and the start moment of the second scan signal Gate2 to be greater than 0 facilitates the reliable switching of working states of the first transistor and the second transistor. After the first transistor is completely turned off, the second scan signal Gate2 controls the second transistor to turn on, thereby avoiding that when the second transistor is turned on, the first transistor is still in an on state and the charging and discharging processes of the bootstrap capacitor are affected, avoiding affecting a bootstrap effect of the voltage at the first electrode of the bootstrap capacitor C1 and ensuring that the boosting unit can work stably and accurately.

It is to be noted that the interval time al between the end moment of the first scan signal Gate1 and the start moment of the second scan signal Gate2 may be set according to an actual requirement. The interval time al may be set at a microsecond level, for example, $0<a1\leq 100$ μs, thereby facilitating the improvement of an operating frequency and overall response speed of the pixel circuit and the improvement of the refresh rate of the display panel.

In the same data write stage, the duration of the first scan signal is less than or equal to the duration of the second scan signal.

As shown in FIG. 14, the duration L1 of the first scan signal Gate1 may be equal to the duration L2 of the second scan signal Gate2 so that the implementation of a scanning circuit is relatively simple, no complex timing control logic is needed and the scanning circuit is easy to implement and debug.

In another embodiment, as shown in FIG. 15, the duration L1 of the first scan signal Gate1 may also be less than the duration L2 of the second scan signal Gate2. The duration L2 of the second scan signal Gate2 is longer so that more sufficient bootstrap time can be provided to the bootstrap capacitor to ensure that the bootstrap capacitor completes the bootstrap charging process and the first electrode of the bootstrap capacitor reaches a required bootstrap voltage, thereby ensuring that the boosting unit works accurately and reliably. Moreover, setting the duration L1 of the first scan signal Gate1 to be shorter facilitates the improvement of the operating frequency and overall response speed of the pixel circuit and the improvement of the refresh rate of the display panel.

The boosting unit further includes a reset transistor, a first electrode of the reset transistor is connected to a reset signal line, and the reset signal line is configured to receive a reset signal. A gate of the reset transistor is electrically connected to a fourth scan signal line. The fourth scan signal line is configured to receive a fourth scan signal. A second electrode of the reset transistor is electrically connected to the first electrode of the bootstrap capacitor, and/or a second electrode of the reset transistor is electrically connected to the second electrode of the bootstrap capacitor.

The working period of the pixel circuit further includes a reset stage before the data write stage. In the reset stage, the fourth scan signal line provides the fourth scan signal to the gate of the reset transistor. The fourth scan signal is an effective pulse for controlling the reset transistor to turn on.

As shown in FIG. 20, when the pixel circuit is working, the reset stage tv and the data write stage tw are performed in sequence.

In the reset stage tv, the fourth scan signal line provides the fourth scan signal to the gate of the reset transistor. The fourth scan signal is an effective pulse for controlling the reset transistor to turn on. For example, when the reset transistor is an n-type transistor, the fourth scan signal Gate4 may be a high-level pulse signal, and when the reset transistor is a p-type transistor, the fourth scan signal Gate4 may be a low-level pulse signal. In FIG. 20, that the reset transistor is an n-type transistor is used as an example for illustration, but is not limited thereto.

Further, the fourth scan signal Gate4 enables the reset transistor to turn on. In this case, the reset transistor conducts between the first electrode of the reset transistor and the second electrode of the reset transistor so that conduction between the reset signal line and the first electrode and/or the second electrode of the bootstrap capacitor is permitted and the reset signal Vref provided by the reset signal line is applied to the first electrode and/or the second electrode of the bootstrap capacitor, thereby counteracting or clearing the residual charges on the bootstrap capacitor from the previous frame, reducing the effect of the residual charges on the bootstrap capacitor C1 from the previous frame on the bootstrap voltage in the current frame and contributing to improving the accuracy and stability of the bootstrap voltage.

Figure 29:
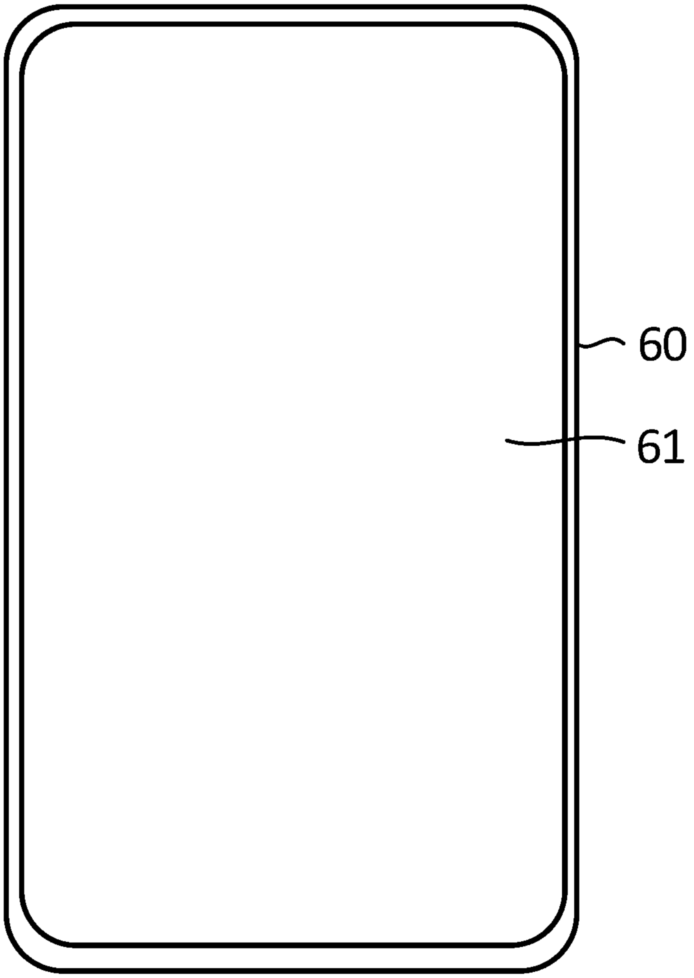
FIG. 29 is a structure diagram of a display device according to an embodiment of the present disclosure.

Based on the same inventive concept, embodiments of the present disclosure further provide a display device. FIG. 29 is a structure diagram of a display device according to an embodiment of the present disclosure. As shown in FIG. 29, the display device 60 includes the display panel 61 described in any embodiment of the present disclosure. Therefore, the display device 60 provided in the embodiment of the present disclosure has the technical effects of the solution in any preceding embodiment, and structures and explanations of terms which are the same as or correspond to the structures and explanations of terms of the preceding embodiments are not repeated here.

The display device 60 provided in the embodiment of the present disclosure may be the cellphone shown in FIG. 29 or may be any other electronic product having a display function. The electronic product includes, but is not limited to, an electronic book, a television set, a laptop, a desktop display, a tablet, a digital camera, a smart bracelet, smart glasses, an in-vehicle display, a medical device, an industrial control device, or a touch interactive terminal. The display device 60 is not limited in the embodiment of the present disclosure.

It is to be understood that various forms of processes shown above may be adopted with steps reordered, added or deleted. For example, the steps described in the present disclosure may be performed in parallel, sequentially or in different sequences, as long as the desired results of the solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modification, equivalent substitution, improvement or the like made within the spirit and principle of the present disclosure is within the scope of the present disclosure.

What is claimed is:

1. A display panel, comprising a pixel circuit; wherein the pixel circuit comprises a drive transistor and a boosting unit;

a first electrode of the drive transistor is connected to a pixel electrode;

a first terminal of the boosting unit is connected to a first data signal line, and the first data signal line is configured to receive a first data signal; and a second terminal of the boosting unit is connected to a gate of the drive transistor, or a second terminal of the boosting unit is connected to a second electrode of the drive transistor;

wherein the boosting unit comprises a first transistor, a second transistor, a bootstrap capacitor and a reset transistor;

a first electrode of the reset transistor is connected to a reset signal line, and the reset signal line is configured to receive a reset signal;

a gate of the reset transistor is connected to a fourth scan signal line, and the fourth scan signal line is configured to receive a fourth scan signal; and a second electrode of the reset transistor is electrically connected to one of the first electrode of the bootstrap capacitor or the second electrode of the bootstrap capacitor; and wherein a working period of the pixel circuit comprises a reset stage and a data write stage in sequence;

in the reset stage, the fourth scan signal line provides the fourth scan signal to the gate of the reset transistor, and the fourth scan signal is an effective pulse for controlling the reset transistor to turn on to write the reset signal into the one of the first electrode of the bootstrap capacitor or the second electrode of the bootstrap capacitor; and in the data write stage, the first data signal line provides the first data signal to the first terminal of the boosting unit.

2. The display panel according to claim 1, wherein a gate of the first transistor is connected to a first scan signal line, the first scan signal line is configured to receive a first scan signal, and a first electrode of the first transistor is connected to a first electrode of the bootstrap capacitor;

a gate of the second transistor is connected to a second scan signal line, the second scan signal line is configured to receive a second scan signal, a first electrode of the second transistor is connected to a second electrode of the bootstrap capacitor, and a second electrode of the second transistor is connected to a second electrode of the first transistor; and the second electrode of the first transistor is used as the first terminal of the boosting unit, and the first electrode of the first transistor is used as the second terminal of the boosting unit.

3. The display panel according to claim 2, wherein the second terminal of the boosting unit is connected to the gate of the drive transistor; and the second electrode of the drive transistor is connected to a second data signal line, and the second data signal line is configured to receive a second data signal.

4. The display panel according to claim 3, wherein a working period of the pixel circuit comprises a data write stage; wherein in the data write stage, the first data signal line provides the first data signal to the first terminal of the boosting unit; and the data write stage comprises a first sub-stage and a second sub-stage in sequence; wherein in the first sub-stage, the first scan signal line provides the first scan signal to the gate of the first transistor, and the first scan signal is an effective pulse for controlling the first transistor to turn on to write the first data signal into the gate of the drive transistor; and in the second sub-stage, the second scan signal line provides the second scan signal to the gate of the second transistor, and the second scan signal is an effective pulse for controlling the second transistor to turn on to increase a voltage of the gate of the drive transistor.

5. The display panel according to claim 4, wherein in the second sub-stage, the second data signal line provides the second data signal to the second electrode of the drive transistor; and $|(1/2)*data2|<|data1|<|data2|$, wherein data1 is a voltage of the first data signal, and data2 is a voltage of the second data signal.

6. The display panel according to claim 2, wherein the second terminal of the boosting unit is connected to the second electrode of the drive transistor; and the gate of the drive transistor is connected to a third scan signal line, and the third scan signal line is configured to receive a third scan signal.

7. The display panel according to claim 6, wherein a working period of the pixel circuit comprises a data write stage; wherein in the data write stage, the first data signal line provides the first data signal to the first terminal of the boosting unit; and the data write stage comprises a first sub-stage and a second sub-stage in sequence; wherein in the first sub-stage, the first scan signal line provides the first scan signal to the gate of the first transistor, and the first scan signal is an effective pulse for controlling the first transistor to turn on to write the first data signal into the second electrode of the drive transistor; and in the second sub-stage, the second scan signal line provides the second scan signal to the gate of the second transistor, and the second scan signal is an effective pulse for controlling the second transistor to turn on to increase a voltage of the second electrode of the drive transistor.

8. The display panel according to claim 7, wherein the third scan signal line and the second scan signal line are a same signal line.

9. The display panel according to claim 7, wherein in a same data write stage, interval time between an end moment of the first scan signal and a start moment of the second scan signal is greater than 0; and/or duration of the first scan signal is less than or equal to duration of the second scan signal.

10. The display panel according to claim 2, wherein the pixel circuit further comprises a storage capacitor, wherein a first electrode of the storage capacitor is electrically connected to the first electrode of the drive transistor, a second electrode of the storage capacitor is connected to a first power signal line, and the first power signal line is configured to receive a first power signal; and a capacitance value of the bootstrap capacitor is greater than or equal to a capacitance value of the storage capacitor.

11. The display panel according to claim 2, wherein the display panel comprises a first substrate; the drive transistor comprises a first active layer, a first source and drain layer and a first gate that are stacked, wherein the first gate is located on a side of the first active layer facing the first substrate; and one of the first electrode of the bootstrap capacitor or the second electrode of the bootstrap capacitor is located in a same film layer as the first source and drain layer, and the other of the first electrode of the bootstrap capacitor and the second electrode of the bootstrap capacitor is located in a same film layer as the first gate; or the display panel comprises a first substrate and a light-shielding layer; the drive transistor comprises a first active layer, a first source and drain layer and a first gate that are stacked, wherein the first gate is located on a side of the first active layer facing away from the first substrate; the light-shielding layer is located on a side of the first active layer facing the first substrate and at least partially overlaps the first active layer in a thickness direction of the first substrate; and one of the first electrode of the bootstrap capacitor or the second electrode of the bootstrap capacitor is located in a same film layer as the first gate, and the other of the first electrode of the bootstrap capacitor and the second electrode of the bootstrap capacitor is located in a same film layer as the light-shielding layer.

12. The display panel according to claim 2, wherein the bootstrap capacitor comprises a plurality of sub-capacitors connected in parallel.

13. The display panel according to claim 2, wherein a channel width-to-length ratio of the drive transistor is greater than at least one of a channel width-to-length ratio of the first transistor or a channel width-to-length ratio of the second transistor.

14. The display panel according to claim 2, wherein the display panel comprises a central display region and an edge display region surrounding the central display region; wherein a pixel circuit located in the central display region is a first pixel circuit, and a pixel circuit located in the edge display region is a second pixel circuit; and a capacitance value of a bootstrap capacitor in the first pixel circuit is less than a capacitance value of a bootstrap capacitor in the second pixel circuit; and/or a channel width-to-length ratio of a first transistor in the first pixel circuit is less than a channel width-to-length ratio of a first transistor in the second pixel circuit, and/or a channel width-to-length ratio of a second transistor in the first pixel circuit is less than a channel width-to-length ratio of a second transistor in the second pixel circuit.

15. The display panel according to claim 1, wherein the display panel comprises a central display region and an edge display region surrounding the central display region; wherein a pixel circuit located in the central display region is a first pixel circuit, and a pixel circuit located in the edge display region is a second pixel circuit; and a channel width-to-length ratio of a drive transistor in the first pixel circuit is less than a channel width-to-length ratio of a drive transistor in the second pixel circuit.

16. The display panel according to claim 2, wherein the pixel circuit further comprises an auxiliary capacitor, wherein a first electrode of the auxiliary capacitor is connected to the first electrode of the second transistor, a second electrode of the auxiliary capacitor is connected to a first power signal line, and the first power signal line is configured to receive a first power signal.

17. The display panel according to claim 1, wherein the display panel further comprises a first substrate, a second substrate and an electrophoretic display layer and a common electrode layer that are located between the first substrate and the second substrate; wherein the electrophoretic display layer is located on a side of the pixel electrode facing away from the first substrate, and the common electrode layer is located on a side of the electrophoretic display layer facing away from the pixel electrode.

18. A display device, comprising a display panel, wherein the display panel comprises a pixel circuit; the pixel circuit comprises a drive transistor and a boosting unit; a first electrode of the drive transistor is connected to a pixel electrode; a first terminal of the boosting unit is connected to a first data signal line, and the first data signal line is configured to receive a first data signal; and a second terminal of the boosting unit is connected to a gate of the drive transistor, or a second terminal of the boosting unit is connected to a second electrode of the drive transistor;

wherein the boosting unit comprises a first transistor, a second transistor, a bootstrap capacitor and a reset transistor;

a first electrode of the reset transistor is connected to a reset signal line, and the reset signal line is configured to receive a reset signal;

a gate of the reset transistor is connected to a fourth scan signal line, and the fourth scan signal line is configured to receive a fourth scan signal; and a second electrode of the reset transistor is electrically connected to one of the first electrode of the bootstrap capacitor or the second electrode of the bootstrap capacitor; and wherein a working period of the pixel circuit comprises a reset stage and a data write stage in sequence;

in the reset stage, the fourth scan signal line provides the fourth scan signal to the gate of the reset transistor, and the fourth scan signal is an effective pulse for controlling the reset transistor to turn on to write the reset signal into the one of the first electrode of the bootstrap capacitor or the second electrode of the bootstrap capacitor; and in the data write stage, the first data signal line provides the first data signal to the first terminal of the boosting unit.

* * * * *